United States Patent
Sica et al.

(10) Patent No.: US 12,061,950 B1
(45) Date of Patent: Aug. 13, 2024

(54) SYSTEMS AND METHODS OF IDENTIFYING PRODUCTS THROUGH PORTABLE SCANNING

(71) Applicant: Walmart Apollo, LLC, Bentonville, AR (US)

(72) Inventors: David W. Sica, Fort Collins, CO (US); Thiago Pereira Rocha, Santa Clara, CA (US); Jeffrey Lui, San Ramon, CA (US); Lars C. Rehder, San Bruno, CA (US); John C. Liedtke, Tualatin, OR (US); Adil Ansari, San Francisco, CA (US); Pin Jui Huang, Sunnyvale, CA (US); Suk Wai Theda Chong, Santa Clara, CA (US); Khasan Shirmatov, McKinney, TX (US); Sheetal Patel, McKinney, TX (US); Matheus K. Iser, Murrieta, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/203,433

(22) Filed: May 30, 2023

(51) Int. Cl.
*G06K 7/10* (2006.01)
*G06V 10/75* (2022.01)
(Continued)

(52) U.S. Cl.
CPC ..... *G06K 7/10861* (2013.01); *G06K 7/10881* (2013.01); *G06K 7/1093* (2013.01);
(Continued)

(58) Field of Classification Search
CPC ............. G06K 7/1093; G06K 7/10861; G06K 2207/1017; G06K 7/00; G06V 10/96; G06F 18/00; B07C 5/34
See application file for complete search history.

(56) References Cited

U.S. PATENT DOCUMENTS

| | | | |
|---|---|---|---|
| 5,237,163 A * | 8/1993 | Collins, Jr. | G06K 7/10881 235/462.25 |
| 8,556,177 B2 * | 10/2013 | Hussey | A61B 5/411 235/462.01 |

(Continued)

FOREIGN PATENT DOCUMENTS

WO  2018035677 A1  3/2018

OTHER PUBLICATIONS

Sales Shark; "Walmart Scan & Go | How it Works & Important Things to Know"; <https://www.youtube.com/watch?v=W3fZ6hRFAe0>; Feb. 11, 2022; 13 pages.

(Continued)

*Primary Examiner* — Daniel I Walsh
(74) *Attorney, Agent, or Firm* — Foley IP Law, PLLC

(57) ABSTRACT

Some embodiments product identifying systems comprising: a scanner control circuit; an imaging system; a display; and a memory storing a product identifier module executed by the control circuit to: detect, through a series of images, a machine-readable identifier pattern; control the display to render the series of images on the display; activate a scan timer having a scan duration; render, on the display, a scan timer graphic overlaid on a subset of the series of images and corresponding to a changing remaining time of the scan duration as the remaining time expires; confirm that the identifier pattern was maintained within a threshold distance of the center of the field of view over at least a threshold read duration of the scan duration; extract identifying information; and obtain a product identifier corresponding to the identifying information and add the product identifier to a virtual shopping cart.

19 Claims, 17 Drawing Sheets

(51) Int. Cl.
  *G06V 10/96*        (2022.01)
  *G06V 20/64*        (2022.01)
(52) U.S. Cl.
  CPC ......... *G06K 7/1095* (2013.01); *G06V 10/757*
         (2022.01); *G06V 10/96* (2022.01); *G06V*
         *20/64* (2022.01); *G06K 2207/1017* (2013.01)

(56)           References Cited

U.S. PATENT DOCUMENTS

| | | | | |
|---|---|---|---|---|
| 9,326,715 | B1* | 5/2016 | Panasyuk | A61B 5/14546 |
| 10,068,221 | B1* | 9/2018 | Thomas | G06Q 20/322 |
| 10,121,133 | B2 | 11/2018 | Nelms | |
| 10,496,909 | B1* | 12/2019 | Holman | G07D 7/0043 |
| 10,803,435 | B2 | 10/2020 | Nelms | |
| 10,936,837 | B1* | 3/2021 | Deacon | G06K 19/06037 |
| 10,990,960 | B2 | 4/2021 | Koeppel | |
| 10,997,544 | B1* | 5/2021 | Bar-Zeev | B64C 39/024 |
| 11,328,139 | B1* | 5/2022 | Britts | G06K 7/1096 |
| 11,381,729 | B1* | 7/2022 | Poloniewicz | H04N 23/56 |
| 11,424,016 | B1* | 8/2022 | Hoffman | B65B 7/2885 |
| 11,532,149 | B1* | 12/2022 | Floerkemeier | G06T 11/00 |
| 2005/0015310 | A1* | 1/2005 | Frantz | G06Q 30/0601 |
| | | | | 705/26.1 |
| 2009/0032590 | A1* | 2/2009 | Hopkins | A61H 3/061 |
| | | | | 235/385 |
| 2011/0024490 | A1* | 2/2011 | Kangas | G06K 7/1095 |
| | | | | 235/487 |
| 2011/0215146 | A1* | 9/2011 | Shams | G06Q 30/06 |
| | | | | 235/462.07 |
| 2012/0048937 | A1* | 3/2012 | Dahari | G06K 7/10 |
| | | | | 235/462.25 |
| 2012/0173347 | A1 | 7/2012 | De Almeida Neves | |
| 2015/0012339 | A1* | 1/2015 | Onischuk | G07C 13/00 |
| | | | | 235/386 |
| 2017/0316277 | A1* | 11/2017 | Nobuoka | G06T 7/11 |
| 2018/0240088 | A1 | 8/2018 | Nelms | |
| 2019/0210849 | A1* | 7/2019 | High | H04N 13/282 |
| 2019/0236531 | A1* | 8/2019 | Adato | H04N 23/80 |
| 2019/0288845 | A1* | 9/2019 | Wah | G06F 21/88 |
| 2019/0318417 | A1* | 10/2019 | Gumaru | G06Q 30/0635 |
| 2020/0017317 | A1* | 1/2020 | Yap | G06Q 10/08 |
| 2020/0019743 | A1* | 1/2020 | Lei | G06K 7/1452 |
| 2020/0202089 | A1* | 6/2020 | Suman | G06K 7/10831 |
| 2020/0202094 | A1* | 6/2020 | D'Ercoli | G06K 7/10544 |
| 2021/0133410 | A1* | 5/2021 | Wang | G06K 7/10881 |
| 2021/0334489 | A1* | 10/2021 | Hoggatt | G06K 7/10207 |
| 2022/0019780 | A1* | 1/2022 | Ozserin | G06F 3/017 |
| 2022/0084629 | A1* | 3/2022 | Shah | G06K 7/1473 |
| 2022/0148156 | A1* | 5/2022 | Dwivedi | G06T 7/73 |
| 2022/0222459 | A1* | 7/2022 | Alakkawi | G06K 7/1095 |
| 2022/0277280 | A1* | 9/2022 | Yajima | G06K 7/1413 |
| 2023/0043615 | A1* | 2/2023 | Saitoh | G07G 1/01 |
| 2023/0121652 | A1* | 4/2023 | Francis | G06Q 10/087 |
| | | | | 705/26.8 |
| 2023/0350068 | A1* | 11/2023 | Saitou | G01S 17/10 |

OTHER PUBLICATIONS

Sam's Club; "Scan & Go"; <https://www.samsclub.com/content/scan-and-go>; available at least as early as May 2, 2023; 9 pages.

* cited by examiner

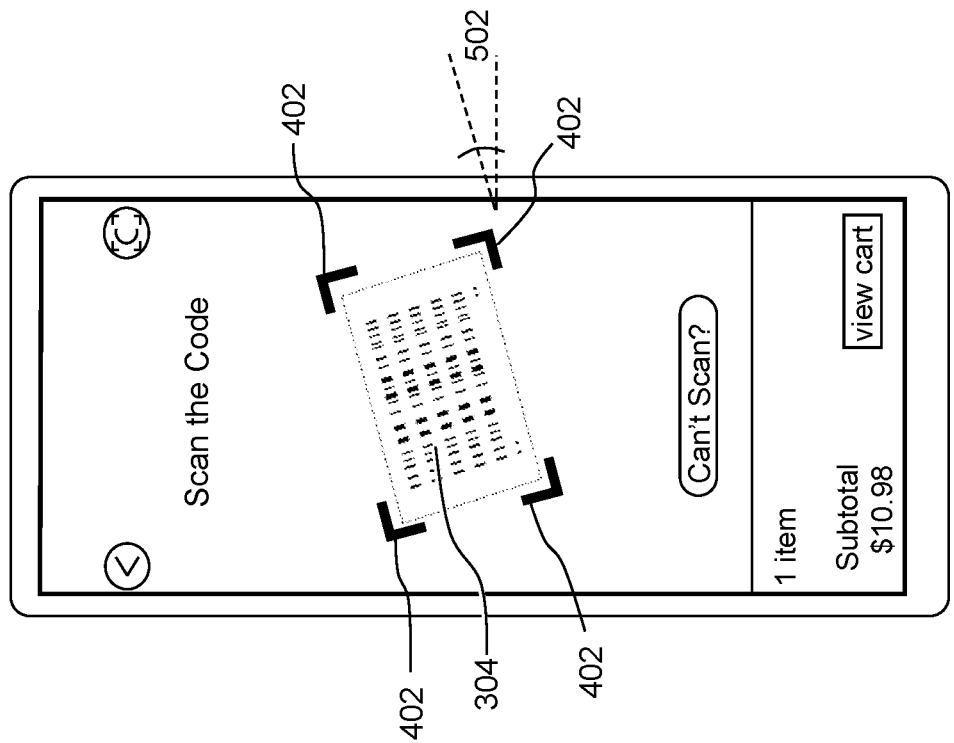
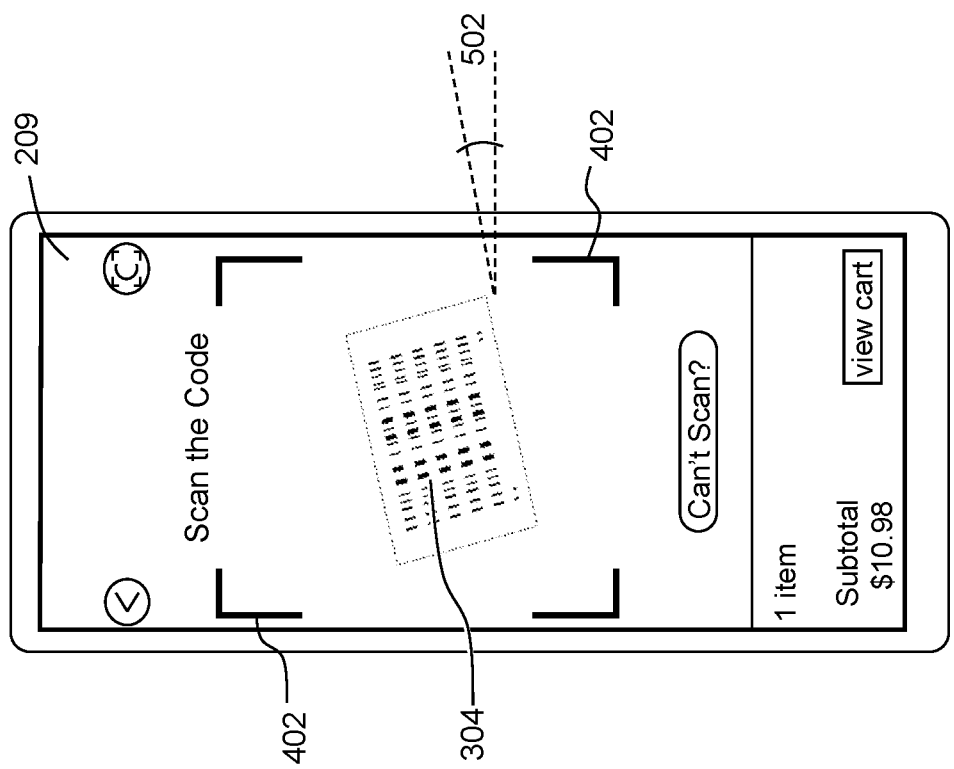

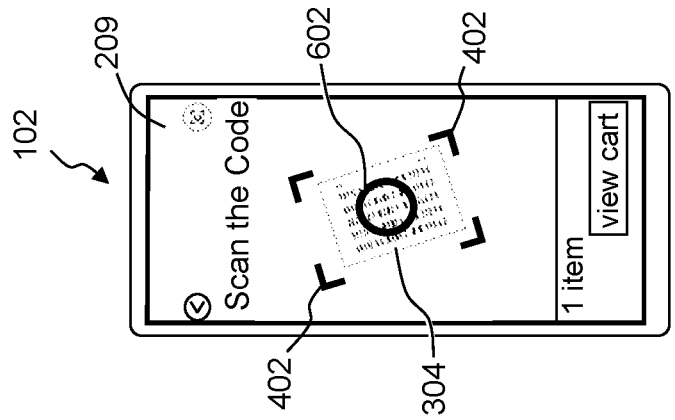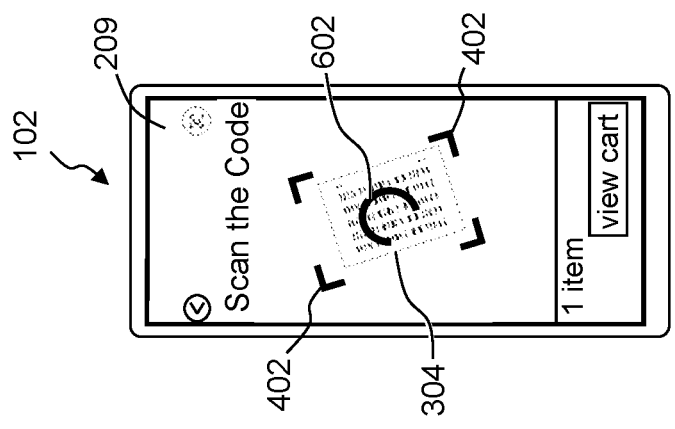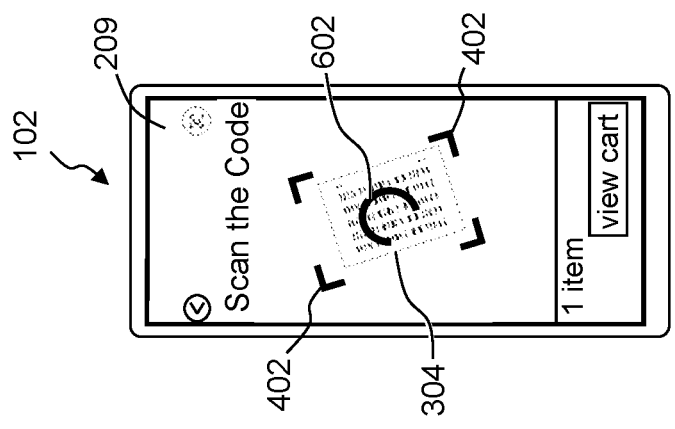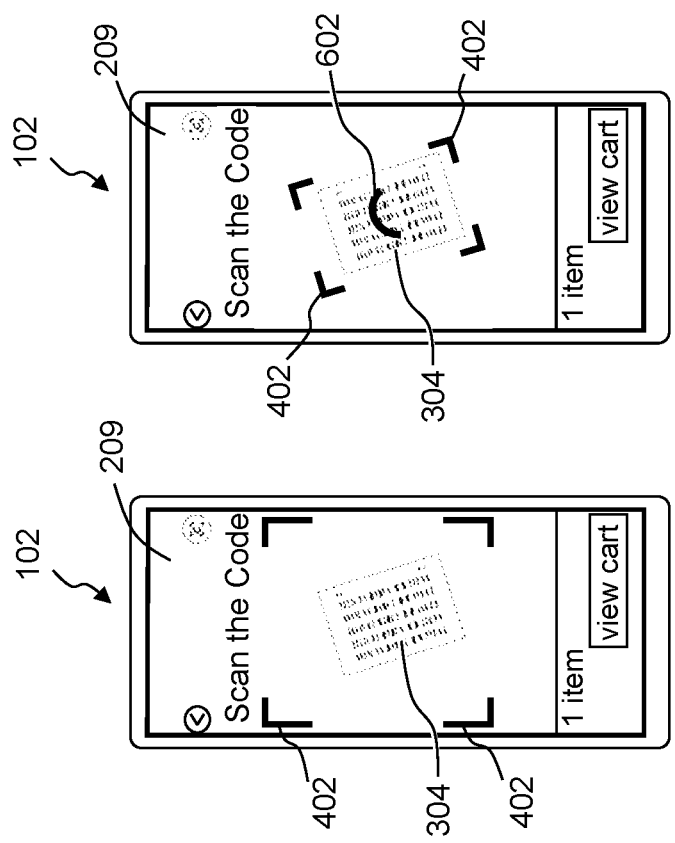

SYSTEMS AND METHODS OF IDENTIFYING PRODUCTS THROUGH PORTABLE SCANNING

TECHNICAL FIELD

This invention relates generally to retail product recognition.

BACKGROUND

The accurate identification of products can often be critical in the retail industry. The misidentification of a product can cause significant problems and lost revenue. Costly customized scanners are typically required to scan products. Many of these customized scanners have limited use and/or are restricted to a particular location.

BRIEF DESCRIPTION OF DRAWINGS

Disclosed herein are embodiments of systems, apparatuses and methods pertaining to retail product identification. This description includes drawings, wherein:

FIG. 5A shows a representation of an exemplary scanning system displaying exemplary targeting graphics at a first position and orientation, for example indicating a first area of the displayed image, in accordance with some embodiments.

FIG. 5B shows the exemplary scanner system of FIG. 5A with the exemplary targeting graphics adjusted relative to an identifier pattern, in accordance with some embodiments.

FIGS. 6A-6D illustrate simplified block diagram representations of an exemplary scanner system that is displaying images on the display of a portion of a product that includes an identifier pattern, in accordance with some embodiments.

Figure 1:
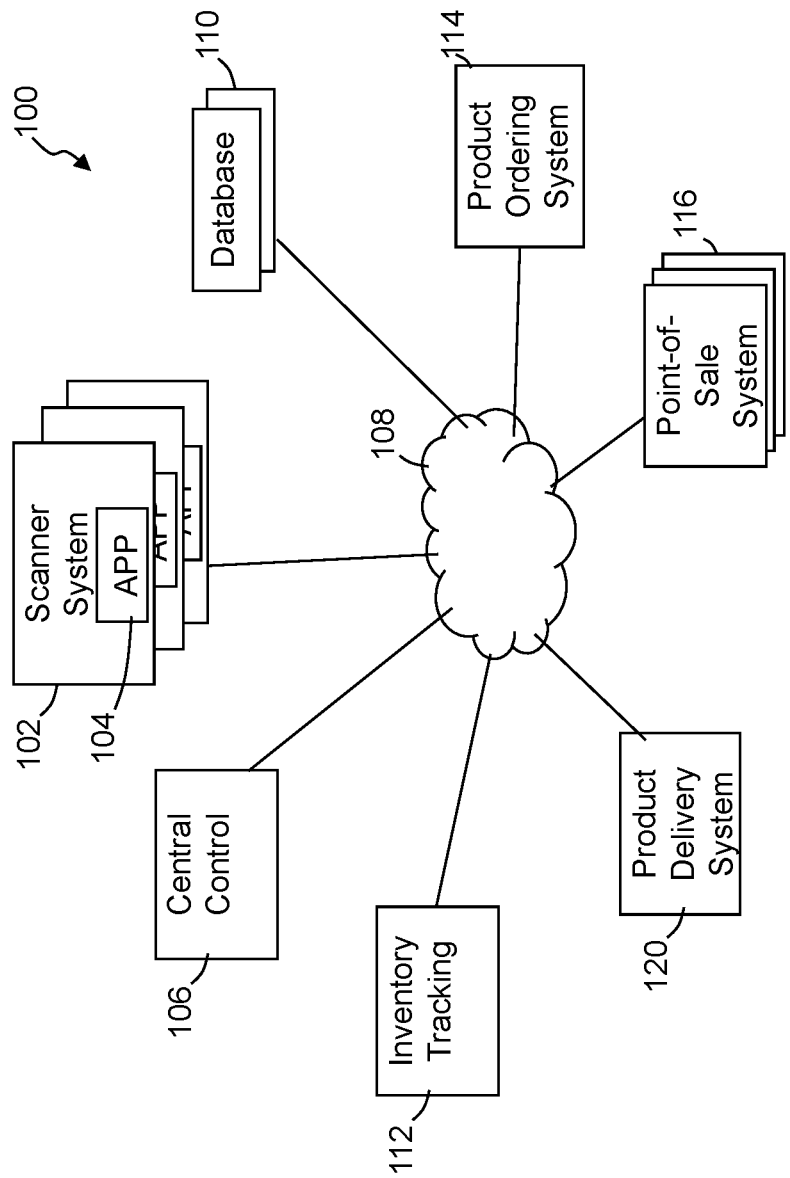
FIG. 1 illustrates a simplified block diagram of an exemplary retail product identifying system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Some embodiments provide systems and methods of improving the automated identification of retail products and identifying information on items. This can, in some implementations, operate to provide an enhanced user interface that generates feedback to the user to increase the reliability of the identification, improves the speed of identification, reduces incorrect identifications and/or false-positives, and other such advantages, while further providing users with more confidence of accurate identification, and increased efficiency. These improvements provide a more reliable system to enable users to accurately identify products and subsequently use that product identification to control subsequent processes. For example, some embodiments utilize the enhanced identification and feedback to improve product purchases by customers, and/or product distribution and placement through a retail facility by retail equipment and/or retail personnel.

Some embodiments provide mobile retail scanner systems that comprise a control circuit, an imaging system communicatively coupled with the control circuit. The control circuit can be configured to control the imaging system to capture sets of images. The mobile scanner system can further include a display communicatively coupled with the control circuit, and a memory communicatively coupled with the control circuit. The memory can store local code comprising a product identifier module configured to be executed by the control circuit to: detects a first identifier pattern within one or more of the first set of images having a distance relationship to a center of a field of view of the imaging system; control the display to display the first set of images captured wherein the first set of images are captured at a predefined motion value; control the display to render a timer graphic overlaid proximate to the first identifier pattern within a subset of the first set of images representing a scan time duration; extract identifying information based on the first identifier pattern in response to the first identifier pattern being maintained within the distance relationship of the center of the field of view over at least the scan time duration; and obtain a product identifier corresponding to the identifying information and add the product identifier to a virtual shopping cart.

Methods are provided, in some embodiments, to identify products. Some embodiments comprise detecting, through a first series of images captured by an imaging system of a scanner system, a machine-readable first identifier pattern determined to have a distance relationship to a center of a field of view of the imaging system; controlling a display of the scanner system to render the first series of images on the display as the respective images of the first series of images are captured; activating a scan timer having a first scan duration; rendering, on the display while displaying a first subset of the first series of images, a scan timer graphic overlaid on the first subset of the first series of images and corresponding to a changing remaining time of the scan duration as the remaining time expires; confirming that the first identifier pattern was maintained within a threshold distance of the center of the field of view over at least a threshold read duration of the scan duration; extracting identifying information from based on the first identifier pattern in response to confirming that the first identifier pattern was maintained within the threshold distance of the center of the field of view over at least the threshold read duration of the scan duration; and obtaining a product identifier corresponding to the identifying information and adding the product identifier to a virtual shopping cart.

FIG. 1 illustrates a simplified block diagram of an exemplary retail product identifying system 100, in accordance with some embodiments. The product identifying system 100 enables numerous scanner systems 102 (e.g., smartphones, tablets, retailer specific systems, communications devices, etc.) operated by different users (e.g., customers, workers, etc.) and/or fixed scanner systems (e.g., associate operated and/or customer operated point-of-sale scanner systems, exit scanner systems, inventory scanner systems, shipping bay scanner systems, entry scanner systems, etc.) to capture images and/or video content of one or more products, items, codes, patterns, color schemes and/or other identifying information that can be used to identify products, items, codes, etc. The scanner systems 102 typically utilize one or more software applications 104 (APP) to enable interaction with the user and provide at least some control over a respective scanner system 102 through a local scanner control circuit. In some embodiments, the product identifying system 100 includes one or more central control systems 106, servers and/or other such systems that can distribute the one or more applications to the mobile devices, provide updates, maintain and/or distribute inventory information, and/or other such operations. The central control systems 106 can be local at a retail facility (e.g., fulfillment center, retail store, distribution center, warehouse, etc.), operated remote from a retail facility or a combination of remote and local through distributed processing of one or more systems communicatively coupled over the one or more distributed wired and/or wireless communication and/or computer networks 108 (e.g., Internet, cellular, Wi-Fi, Bluetooth, other such networks, or combination of two or more of such networks). The scanner systems 102 can be communicatively coupled one or more of the distributed wired and/or wireless communication and/or computer networks 108.

The product identifying system 100 further includes one or more databases 110 that can information relevant to the operation of a retail entity and/or one or more retail facilities, and other information. For example, the databases may include a product database, a customer database, image database, inventory database, orders database, delivery database, and/or other such databases or combinations of two or more of such databases. In some implementations, a retail product database can be configured to store and maintain product information (e.g., identifier information (e.g., name, RFID information, pattern and/or code information (e.g., barcode, QR code, etc.), size, weight, quantity, ingredients, etc.), location(s) in a retail facility, quantities, shipping information, pending order information, history information, etc.), product images, image attribute information, sets of product imaging data each corresponding to one of hundreds to tens of thousands of different objects, items and/or retail products, which are typically available for purchase from a retail entity. Product imaging data can, for example, includes a product identifier, image attribute data exclusively corresponding to the respective product, other such product information, or a combination of two or more of such product information. For example, the product identifier may include one or more patterns, barcodes, QR codes, other such code or a combination of two or more of such identifiers. An inventory database can maintain information about inventory (e.g., count, location, pending orders and/or other such information) of one or more products located at one or more facilities. In some embodiments, one or more databases maintain customer information and/or profiles, which may be updated based on customer purchases, product preferences, relationships with one or more other customers, products identified through their personal portable devices, products considered for purchase, product search information, other such information, and typically a combination of two or more of such information. The databases may be maintained by a retail store, by a retail company having multiple stores, third party entities and/or services, other such entities or a combination of two or more of such entities.

The product identifying system 100, in some embodiments, include one or more inventory tracking systems 112 that track and maintain inventory information about product quantities at one or more retail facilities, locations of items, products on order, quantities of products typically ordered, past order history and/or other such information. This inventory information may be accessed by one or more circuits, systems and/or devices of the system 100, such as the databases that store the inventory information, the central control system 106, the scanner systems 102 in obtaining product information, and the like. The product identifying system 100 may further include one or more product ordering systems 114 that can receive product orders from one or more customers.

Still further, some embodiments include one or more point-of-sale systems 116 that allow the customer to purchase products. Such point of sale systems may be at a retail store operated by workers at the store, operated by the customers, implemented through the central control system 106, implemented as a software application on a remote point of sale system (e.g., through one or more computers, servers or the like), implemented at least in part through the application of a customer's computing system (e.g., smartphone, tablet, computer, laptop, etc.), other such systems or a combination of two or more of such systems. In some embodiments, a terminal sales application may be executed on the central control system 106 or network accesses point of a point of sale system to interact with portable devices of customers. Typically, such remote point of sale systems 116 are different than physical point of sale systems at a retail store, and lacks at least some of the peripheral devices of a physical point of sale system at the retail store (e.g., barcode scanner, scale, physical user interface, etc.). Some embodiments include a product delivery system 120 configured to schedule, manage and/or track product deliveries, delivery vehicles, delivery personnel and/or other such aspects of product delivery based on purchases of products.

Although some of the below description describes product identification occurring on a portable scanner system 102, it will be appreciated that some or all of the processing (e.g., image processing and/or model application processing, etc.) can be performed remote from the portable scanner system.

Figure 2:
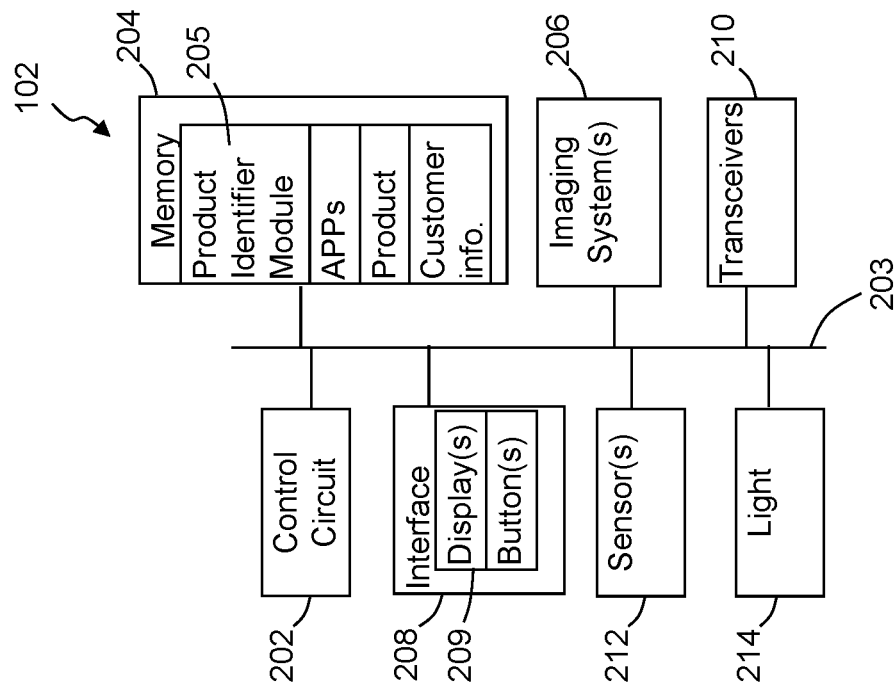
FIG. 2 illustrates a simplified block diagram of an exemplary scanner system, in accordance with some embodiments.

FIG. 2 illustrates a simplified block diagram of an exemplary scanner system 102, in accordance with some embodiments. The exemplary scanner system 102 include a scanner control circuit 202 implemented through one or more processors, microprocessors, logic, local digital storage, firmware, software, and/or other control hardware and/or software. One or more scanner memories 204 can be included and communicatively coupled via one or more communication links 203, buses, and/or other such communication connections with the scanner control circuit 202. The scanner memory 204 can include one or more processor-readable and/or computer-readable media accessed by at least the scanner control circuit 202, and can include volatile and/or nonvolatile media, such as RAM, ROM, EEPROM, flash memory and/or other memory technology. Further, the memory can be internal, external or combination of internal and external to the scanner control circuit 202. Similarly, some or all of the memory can be internal, external or a combination of internal and external memory of the scanner system 102. The memory can store code that can be executable by the scanner control circuit 202 and/or other system components of the scanner system 102, such as applications, product information, customer information, images, machine learning models, other such data, and typically a combination of two or more of such information.

Further, the scanner system 102 typically includes one or more user interfaces 208 enabling a user to interact with and be provided information and/or feedback from the scanner system. Such user interfaces can include one or more displays (e.g., LCD, touchscreen, etc.), one or more buttons, one or more sensor, other such user interfaces, or a combination of two or more of such interfaces. The scanner system 102 can further include one or more cameras and/or other such imaging systems 206 configured to capture still images and/or video content. The imaging system 206 can be controlled by the scanner control circuit 202 and/or activated by the user, such as through a user interface 208. One or more wired and/or wireless communication transceivers 210 can be included in the scanner system 102 enabling communication external to the scanner system 102 (e.g., with the central control system 106, one or more databases 110, one or more POS systems 116, one or more other scanner systems 102, and/or other systems external to the scanner system. The one or more transceivers 210 can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the scanner system 102 include one or more sensors 212 such as but not limited to one or more accelerometers, one or more gyroscopes, one or more RFID tag readers, one or more distance measuring systems, one or more other such sensors, or a combination of two or more of such sensors. One or more lights 214 and/or illumination systems (e.g., one or more LEDs). One or more of such lights 214 can be activated, for example, in cooperation with the imaging system 206, by the user, an application of the scanner system, and/or other such activations.

Figure 3:
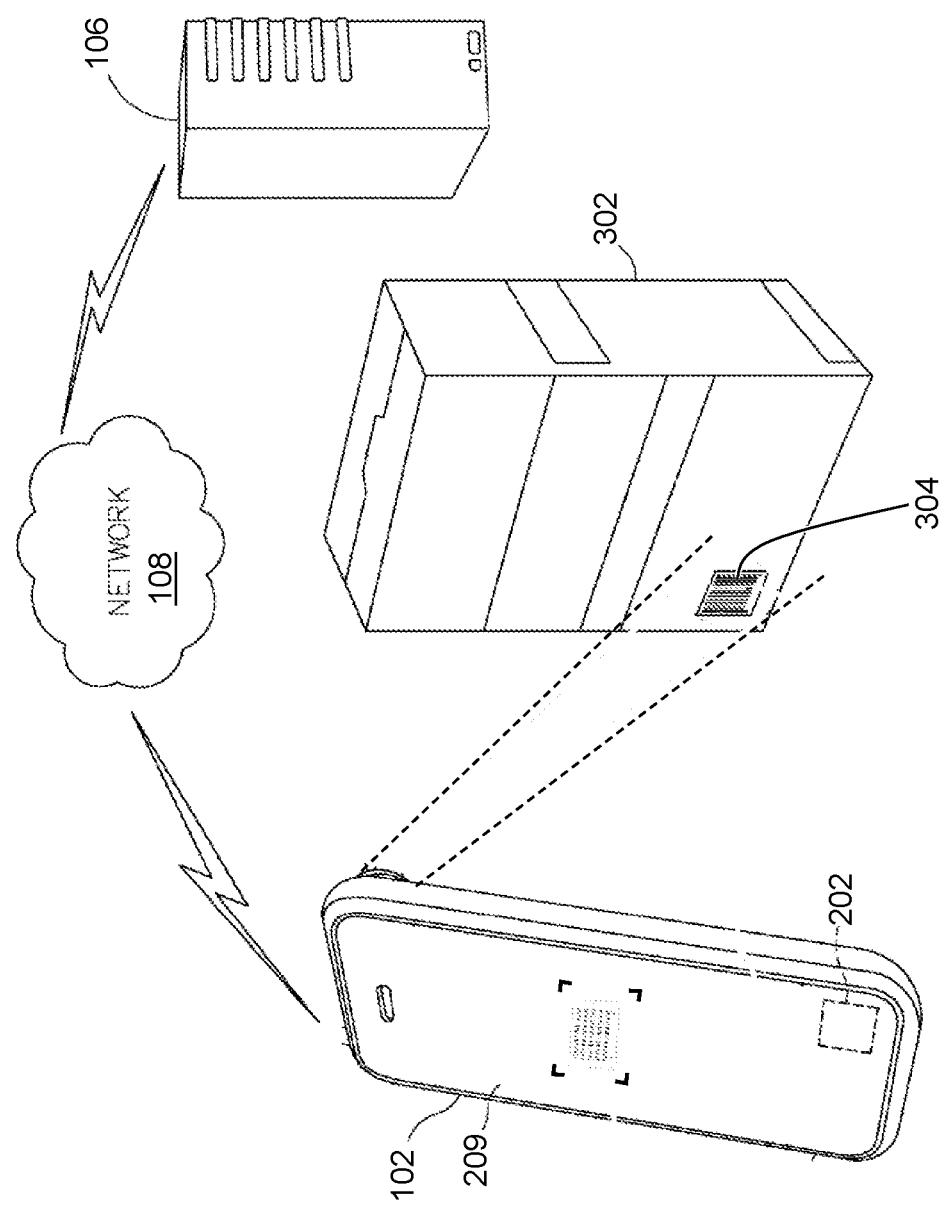
FIG. 3 illustrates an exemplary representation of a portable scanner system scanning a product, in accordance with some embodiments.

FIG. 3 illustrates an exemplary representation of a portable scanner system 102 scanning a product 302, in accordance with some embodiments. The scanning may be implemented as part of a purchasing process at a retail store or other retail establishment obtaining inventory information at a retail facility, confirming a product placement, confirming a purchase, obtaining product information, and/or other such actions. In some embodiments, the scanner system 102 includes a scanner control circuit 202 for executing applications, a display, one or more transceivers 210, an imaging system 206 and/or other scanning module, and/or other system components. The imaging system 206 captures one or more images that can be used to identify the product 302 and/or capture identification information (e.g., barcode, QR code, pattern, color scheme, text, other such identifying information or a combination of two or more of such identifying information) of the product. The scanner system 102 can be configured to communicate with another devices, such as the central control system 106, one or more point of sale systems 116, one or more inventory tracking systems 112, other scanner systems, and/or other devices via one or more computer and/or communication networks 108.

Referring to FIGS. 1-3, as described above the scanner systems 102 typically include a scanner control circuit 202 that can be implemented through one or more processors, microprocessors and/or other control circuitry and/or components. The scanner control circuit couples with memory 204 storing local executable code comprising a product identifier module 205 configured to be executed by the control circuit to detect, through one or more images, and typically a series of images captured by the imaging system 206, one or more machine-readable identifier patterns 304. The product identifier module 205 can be implemented through one or more applications executed by the control circuit. Similarly, some or all of the product identifier module 205 may be implemented remote from the scanner system 102 through communication via the communication network 108. In some embodiments, the control circuit 202 controls the imaging system 206 in response to an activation of an option by a user. This option, for example, may be displayed on the touchscreen display 209 to initiate the identification of a product (e.g., a "SCAN PRODUCT" option rendered on the display). Additionally or alternatively, the imaging system may have previously been activated and the control circuit or an image processing system of the scanner system 102 detects one or more identifier patterns within one or more of the images and/or video being captured by the imaging system.

The control circuit 202 can control the display 209 to render the series of images captured by the imaging system on the display 209 as the respective images of the series of images can be captured to provide feedback to the user and allow the user to control the directional orientation of the imaging system 206 to be directed toward the intended product and/or the identifier pattern corresponding to the intended product. In some embodiments, the control circuit can control the display to provide additional feedback to the user to enhance the user's ability to control the orientation of the imaging system to position the field of view of the imaging system to capture the identifier pattern of the product of interest. The control circuit, in some embodiments for example, control the display to render one or more virtual targeting graphics overlaid on the series of images to provide feedback to the user to indicate that identifier pattern that is to be used to extract identifying information.

Figure 4B:
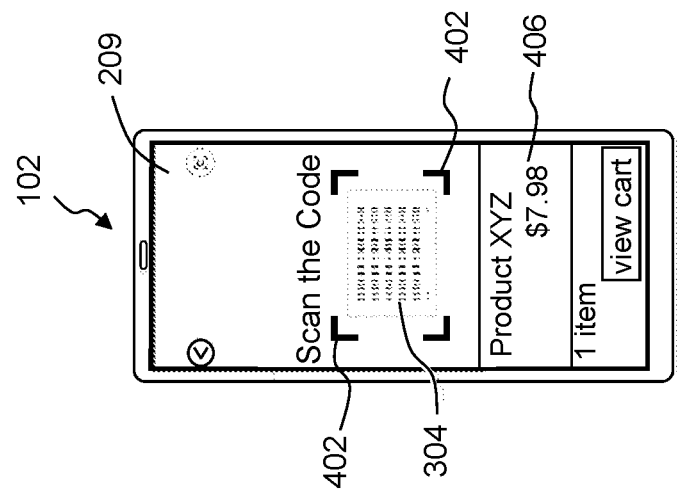
FIG. 4B illustrates a simplified block diagram representation of the exemplary scanner system of FIG. 4A displaying the image on the display of a portion of a product that includes the identifier pattern with the targeting graphic adjusted, in accordance with some embodiments.
Figure 4A:
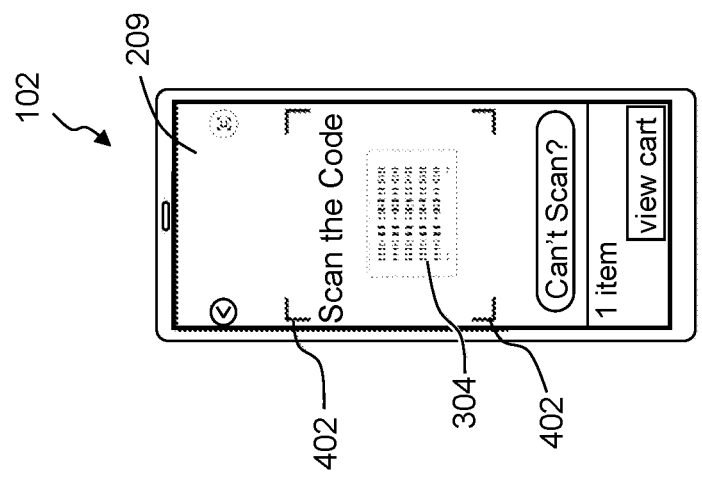
FIG. 4A illustrates a simplified block diagram representation of an exemplary scanner system that is displaying an image on the display of a portion of a product that includes an identifier pattern, in accordance with some embodiments.

FIG. 4A illustrates a simplified block diagram representation of an exemplary scanner system 102 that is displaying an image on the display 209 of a portion of a product that includes an identifier pattern 304, in accordance with some embodiments. The control system further controls the display to render one or more targeting graphics 402 (e.g., four brackets oriented in square or rectangular pattern, one or more circles or parts of one or more circles, or other such graphic) overlaid on the image indicating an area in which a user should try to position the identifier pattern 304. In some embodiments, the images can be evaluated relative to the area of the image within the area defined by an initial placement of the targeting graphics, or another area of the display that is typically less than all of the display. As such, this area of consideration can be less than the field of view of the imaging system and typically less than the area of the display 209, where a border is defined within the field of view that is not considered when attempting to determine whether an identifier pattern is present, while the reduced area of the image is considered.

Still further, in some embodiments, the control circuit and/or image processing processor detects the identifier pattern 304, and the control circuit can control the display to adjust the orientation of the targeting graphic 402 while rendered overlaid over some of the image being captured. FIG. 4B illustrates a simplified block diagram representation of the exemplary scanner system 102 of FIG. 4A displaying the image on the display 209 of a portion of a product that includes the identifier pattern 304 with the targeting graphic 402 adjusted, in accordance with some embodiments. This adjustment of the targeting graphic 402 can be a repositioning, a tilting, a zooming-in, a zooming-out, shifting, other such adjustments or a combination of two or more of such adjustments. Further, the adjustment of the targeting graphic 402 can provide feedback to the user emphasizing the identifier pattern 304 is being processed and/or distinguishing the identifier pattern 304 being processed over other portions of the image, portions of the product, one or more other identifier patterns, and/or other elements within the image. The adjustment of the targeting graphic 402 can include identifying an area of the display occupied by the identifier pattern 304, and adjusting the size of the area indicated by the targeting graphic 402 to be a threshold larger than the area occupied by the identifier pattern (e.g., a percentage larger, a fixed distance extended from determined boundaries of the identifier pattern, other such adjustment, or a combination of such adjustments). Such adjustment, in some instances, can appear as a transition or instantaneous movement of the targeting graphics. Additionally or alternatively, in some implementations, the targeting graphics can vary in color as a function of a state of scanning (e.g., white while in a default location awaiting the detection of an identifier pattern, green while scanning, yellow when one or more conditions are detected that may prevent accurate scanning and/or may await user action (e.g., distance threshold exceeded, motion threshold exceeded, blur threshold exceeded, ambient light threshold not met, etc.), red indicating an error condition preventing accurate scanning, error in a type of identifier pattern and/or other error preventing scanning, and/or other colors for other conditions). In some embodiments, the control circuit controls, in response to obtaining the identifier information based on the scan and corresponding to the identifier pattern 304, obtains product information and controls the display to display product information 406 (e.g., product name, cost, quantity, size, etc.).

Similarly, in some embodiments, the control circuit can control the displayed orientation of the targeting graphic 402 to correspond to an orientation of the identifier pattern 304. FIGS. 5A-5B illustrate simplified block diagram representations of an exemplary scanner system 102 that is displaying an image on the display 209 of a portion of a product that includes an identifier pattern 304, in accordance with some embodiments. The exemplary targeting graphics 402 are shown overlaid on the image at a first position and orientation, for example indicating a first area of the displayed image, in accordance with some embodiments. This first position may be a default position. The product identifier module 205 can be configured to detect dimensions and/or an orientation of the identifier pattern 304 relative to the orientation of the display. The exemplary representation of the identifier pattern 304, illustrated in FIG. 5A, is tilted at an angle 502 relative to the display 208. Based the identified orientation of the identifier pattern 304, the product identifier module 205 can adjust the orientation one or more of the targeting graphics 402 to correspond to that of the identifier pattern 304 to be used in obtaining identifying information.

FIG. 5B shows the exemplary scanner system 102 of FIG. 5A with the exemplary targeting graphics 402 adjusted to reduce the area of the display being indicated to more closely correspond to the dimensions of the identifier pattern 304, and further adjusted to tilt at the angle 502 corresponding to the orientation of the identifier pattern 304 relative to the display 209, in accordance with some embodiments. Accordingly, in some embodiments, the control circuit in executing the product identifier module can be configured to determine an orientation of the identifier pattern 304 relative to an orientation of the display 209. The display can be controlled to render on the display a series of images while rendering the one or more virtual targeting graphics 402 overlaid proximate the identifier pattern 304 indicating the identifier pattern as an identifier pattern of interest based on the determined orientation of the identifier pattern. Further in some instances, the product identifier module, in rendering the targeting graphic 402, can be configured to virtually render over the series of images the one or more targeting graphics 402 proximate one or more boundaries of the identifier pattern while adjusting an orientation of the one or more targeting graphics corresponding to the orientation of the targeting graphic. It is further appreciated that there may be movement of the product, identifier pattern and/or imaging system over time as the user attempts to scan the identifier pattern. Accordingly, the product identifier module 205 can further be configured to track over time the orientation of the identifier pattern relative to the imaging system and/or display, and adjust the orientation of the displayed one or more targeting graphics 402 over time consistent with changes in orientation of the identifier pattern 304 relative to the display and/or field of view of the imaging system.

In some embodiments, a scan timer can be activated in response to a detection of one or more identifier patterns 304. The scan timer can correspond to one or more scan duration thresholds corresponding to a time the control circuit 202 waits as part of a confirmation that the user intends to scan the one or more identifier patterns 304 captured within a series of images. The product identifier module, in some embodiments, may further cause a scan timer graphic to be rendered on the display and overlaid on at least a subset of a series of images being displayed on the display 209.

FIGS. 6A-6D illustrate simplified block diagram representations of an exemplary scanner system 102 that is displaying images on the display 209 of a portion of a product that includes an identifier pattern 304, in accordance with some embodiments. Similar to FIGS. 5A-5B, the representations of the scanner system 102 of FIGS. 6A-6D illustrate the rendering of the targeting graphics 402 adjusted in orientation, size and/or area to correspond to and highlight the identifier pattern 304 of interest, in accordance with some embodiments. This adjustment, in some embodiments, can continue to be adjusted in response to subsequent movement between the imaging system and the identifier pattern occur while being scanned. In some instances, the continued adjustments can be implemented in response to detecting at least a minimum threshold movement between the imaging system and the identifier pattern. FIGS. 6B-6D further illustrate the rendering of a scan timer graphic 602 over time in accordance with some embodiments. The control circuit can activate a scan timer that can be set to a scan duration. The scan duration may be a fixed duration or may be variable depending on one or more factors (e.g., number of identifier patterns being captured in images, distance between the imaging system and the identifier pattern, movement of the imaging system and/or identifier pattern, other such factors or a combination of two or more of such factors). Further, in some embodiments, the control circuit controls the display to render, on the display while displaying at least a subset of the series of images, a scan timer graphic 602 overlaid on the subset of the series of images. The scan timer graphic 602 is changed over time to correspond to a changing remaining time of the scan duration as the remaining time expires and/or counts down (e.g., FIG. 6B illustrating a relatively small scan timer graphic 602, while depicted in FIGS. 6C and 6D the scan timer graphic 602 progressively increases towards a complete circle). In some embodiments, the scan timer graphic 602 is generally circular (e.g., corresponding to a clock and the rotation of hands on the clock). The shape, size, type, position, orientation, color and/or other such parameters of the scan timer graphic can be substantially any relevant shape, size, position, orientation, color and/or other respective parameters. For example, the scan time graphic could be illustrated as a moving or rotating hourglass, an hourglass with representative particles moving from an upper portion to a lower portion, a sequence of lines that can be changed in appears through a sequence or pattern, and/or other such types of graphic(s). Further, in some embodiments, the color, size and/or shape of the scan timer graphic 602 can further be varied over time. For example, the color of the scan timer graphic may change as the scan duration counts down to a threshold. Similarly, the size of the scan timer graphic may increase in response to the scan duration counting down to the threshold or a different threshold. Still further, the color, size and/or shape may vary in response to a detected condition (e.g., movement greater than a threshold, degraded focus, a user interaction, etc.).

Again, the scan timer graphic 602 provides feedback to the user to notify the user of a remaining time before the identifier pattern is read and used to obtain product identifying information. The counting down and overlaid scan timer graphic lets the user know that the user should maintain the position of the imaging system to continue to capture images of the identifier pattern when the user intends to obtain product identifying information for the product corresponding to the identifier pattern, or to shift the imaging system away from the identifier pattern when the user does not intend to obtain product identifying information. The display of one or more scanner timer graphic 602 may be accompanied by one or more sounds, vibrations, other haptics and/or other notifications from the scanner system 102. Similarly, in some instances, sounds, vibrations, other haptics and/or other notifications may be generated in response to an expiration of the scan duration. As described above, the scan duration may be a fixed duration, or may be variable based on one or more factors, such as but not limited to more than one identifier pattern being detected in images, frequency or rate of identifier patterns being read, user history (e.g., adjusted to increase the scan duration when customer repeatedly removes items from a cart of requests a scanned product be disregarded, which may indicate the user needs more time to evaluate and consider), distance between an imaging system and the identifier pattern, other such factors, or a combination of two or more of such factors. Additionally or alternatively, in some embodiments, the product identifier module 205 executed by the control circuit can be configured to receive an instruction to modify the scan duration, and modify the scan duration when applied in a subsequent detection of a subsequently detected identifier pattern. For example, a user may select a settings option provided through the user interface controlled by an APP and define a scan duration and/or select from multiple preset scan duration options.

The product identifier module 205, in some embodiments, can further confirm that and/or determine when the identifier pattern 304 was maintained within a threshold distance of a center of a field of view of the imaging system and/or the display 208 over at least a threshold read duration. The threshold read duration may be a subset of, overlap with some or all of and/or be equal to the scan duration. This confirmation can be used to limit or prevent false positive reads. Accordingly, in such implementations, the user maintains the identifier pattern 304 within the threshold distance of the center of the display as a confirmation that the identifier pattern is of interest and the user wants to acquire identifying information corresponding to the identifier pattern and/or product.

Figure 7:
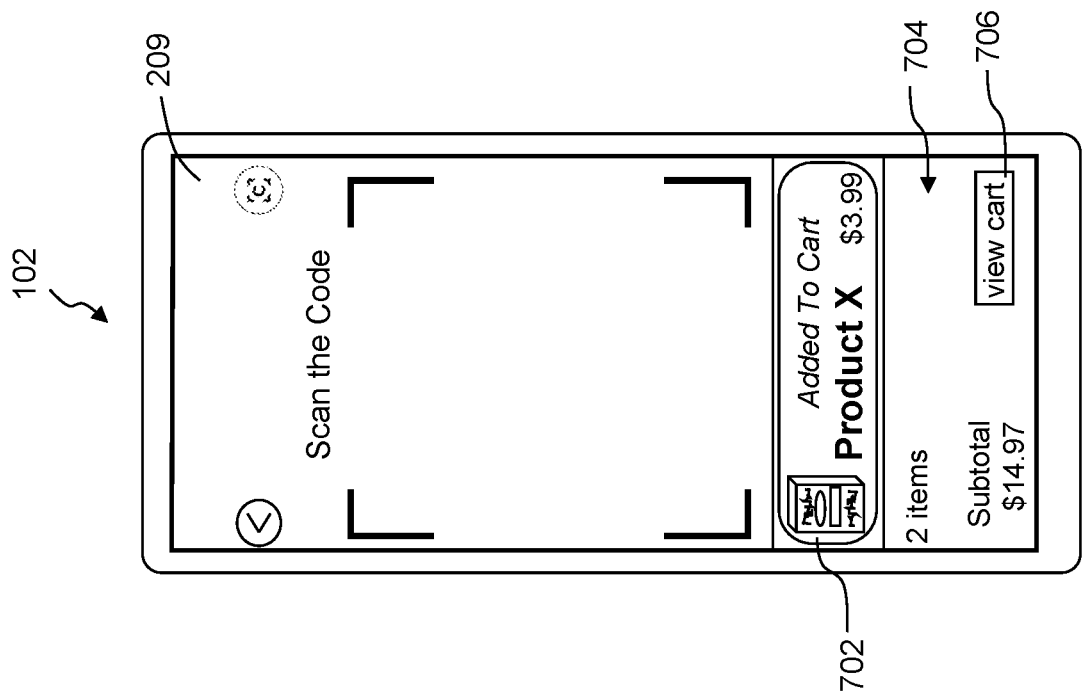
FIG. 7 illustrates a representation of an exemplary scanner system rendering an exemplary added-to-cart indicator following an identification of a product based on the identifying information obtained based on the scanned pattern, in accordance with some embodiments.

The product identifier module 205 can use the identifier pattern 304 to obtain and/or extract identifying information based on the identifier pattern. Again, this extraction can be in response to confirming that the identifier pattern was maintained within the threshold distance of the center of the field of view over at least the threshold read duration of the scan duration. In some instances, for example, the identifying information can be encoded into the identifier pattern and/or the product identifier module accesses a source (e.g., product server and/or database) to obtain the corresponding product identifier information. In some embodiments, the identifier information can be a product identifier. In other instances, the product identifier module can use the identifying information to obtain a product identifier corresponding to the identifying information (e.g., accessing one or more product databases, which may be local on the scanner system 102 and/or a remote database accessed over one or more of the communication networks 108). Further, the scanner control circuit 202 can be configured to add the product identifier to a virtual shopping cart, which can enable the user or a customer to review the cart and/or pay for products added to the virtual shopping cart. For example, the enhanced scanning can be used in cooperation with the virtual cart and the purchase of products based on product identification described in U.S. Pat. No. 10,121,133, filed Nov. 16, 2010, U.S. Pat. No. 10,990,960 filed Feb. 25, 2020, U.S. Patent Application Publication No. 2018/0240088, filed Apr. 18, 2018, and U.S. Pat. No. 10,803,435, filed Dec. 30, 2019, the contents of each is incorporated herein by reference in its entirety. FIG. 7 illustrates a representation of an exemplary scanner system 102 rendering an exemplary added-to-cart indicator 702 following an identification of a product based on the identifying information obtained based on the scanned pattern, in accordance with some embodiments. In some implementations, the product can be added after the user confirms an accuracy of the identified product (e.g., identifying information of the product, such as but not limited to name, size, quantity, image(s), and/or other such information, can be displayed). In some embodiments, one or more options can be displayed to allow the user to accept or decline the identified product and whether to add to a virtual cart (e.g., the one or more options can be provided on the touchscreen display). Some embodiments further display a cart summary 704, which can show for example a total number of times in a cart and a current subtotal based on the products added to the cart. A view cart option 706 may additionally or alternatively be presented to enable the user to view details about the virtual cart and the products that have been added to the virtual cart.

In some embodiments, the control circuit limits the detection and/or the extraction of identifying information of an identifier pattern 304 based on one or more factors. Such factors can include but are not limited to one or more distance relationships, one or more movement factors, one or more ambient light factors, one or more blur factors, one or more pattern type factors, number of pattern factors, other such factors, or a combination of two or more of such factors. In some embodiments, for example, the product identifier module 205 can be configured to detect when more than one identifier patterns are captured within one or more images of a series of images, and prioritize one or more of the identifier patterns based on a pattern type of the identifier patterns. The identifier module, in some implementations, can be configured to recognize different identifier pattern types based on a shape of a pattern, type of encoded information, type of information represented by a pattern, other such information or a combination of such information. For example, two identifier patterns detected by both be barcodes, but each may encode different types of information (e.g., different sequence of numbers that can be recognized and used to distinguish between the two identifier patterns), one identifier pattern may be a one-dimensional barcode while a second may be a QR code, and/or other such differences.

Figure 8B:
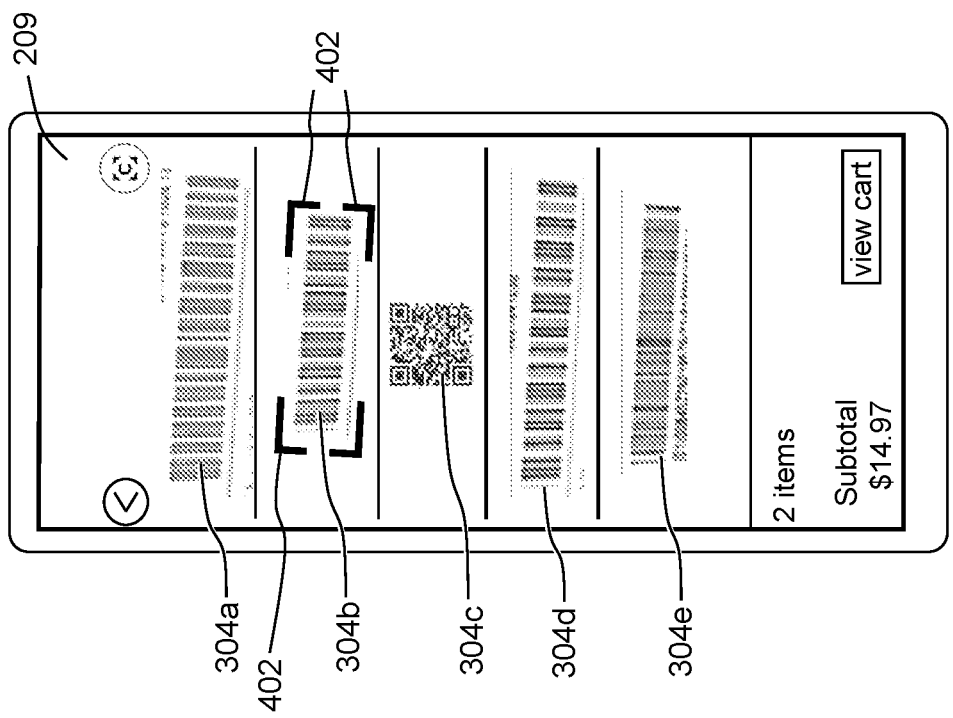
FIGS. 8A-8B illustrate simplified block diagram representations of an exemplary scanner system that is displaying exemplary images on the display of a portion of a product that includes multiple identifier patterns, in accordance with some embodiments.
Figure 8A:
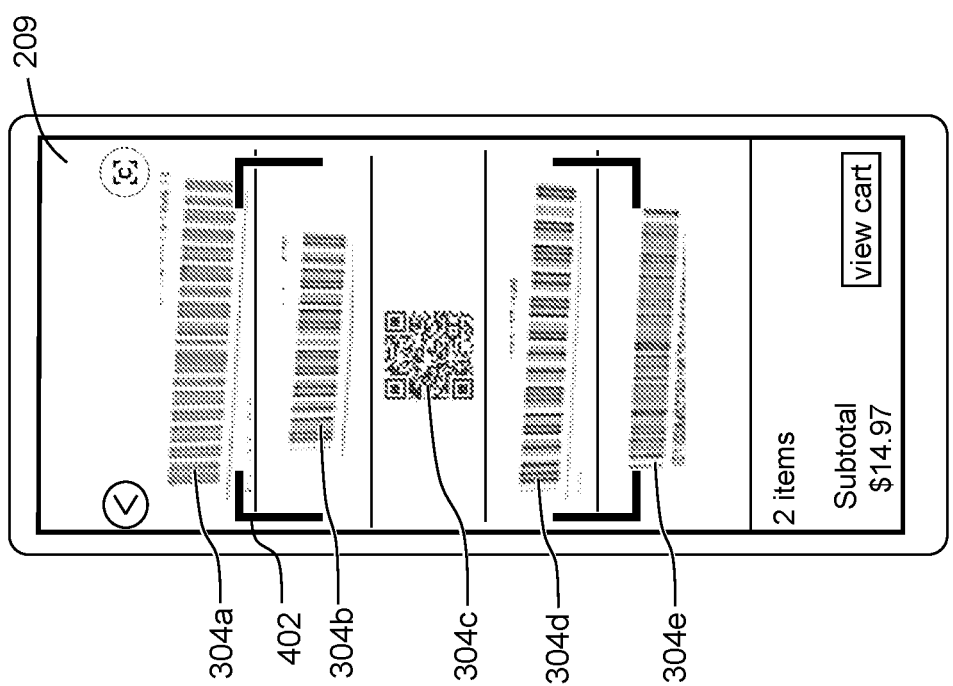

FIGS. 8A-8B illustrate simplified block diagram representations of an exemplary scanner system 102 that is displaying exemplary images on the display 209 of a portion of a product that includes multiple identifier patterns 304a-304e, in accordance with some embodiments. In FIG. 8A, the imaging system is capturing images that include multiple identifier patterns 304a-304e (e.g., barcodes each representing different information and/or having a different pattern type (e.g., representing different alphanumeric string of characters corresponding to different information)). The multiple identifier patterns 304a-304e may be on a single product or on multiple different products. The product identifier module 205 can evaluate the multiple different identifier patterns 304a-304e and prioritize the multiple identifier patterns and/or identify the particular identifier pattern of interest based on one or more factors, such as but not limited to symbology and/or pattern type (e.g., UPC type, QR code, type of information represented (e.g., longer string of alphanumeric characters vs. shorter string of alphanumeric characters), etc.), location of the different identifier patterns of interest relative to a reference point within the field of view of the imaging system and/or a reference point or area of the display 209, distance between the imaging system and the different identifier patterns 304a-304e, clarity of the different identifier patterns, sizes of the identifier patterns, other such factors or a combination of two or more of such factors.

FIG. 8B illustrates the rendering of exemplary targeting graphics 402 having been adjusted in orientation and size to correspond to and indicate a second identifier pattern 304b as the identifier pattern of interest, of the multiple identifier patterns 304a-304e detected within a boundary of the field of view and/or a threshold distance from a reference point of the field of view or display, in accordance with some embodiments. The adjusting of the orientation and/or size of the targeting graphics 402 can distinguish the second identifier pattern 304b from the other of the multiple identifier patterns. Further, in some instances, the adjustment to the orientation and/or size of the targeting graphics may result in the targeting graphics to appear square, rectangular and/or other shape based on the shape of the identifier pattern, such as appearing generally square when bounding a square QR code. The identification of the second identifier pattern 304b can be based, for example, on a symbology and/or type of identifier pattern (e.g., a first type of barcode over a QR code and/or other types of barcodes) and/or the information available through the identifier pattern. Again, the adjustment (e.g., movement, color change, reorientation, other such adjustments or a combination of two or more of such adjustments) of the targeting graphics 402 provides feedback to the user indicating that the second identifier pattern 304b is considered the identifier pattern of interest and is being used to identify the product, instead of in this illustrated example the first, or third-fifth identifier patterns

304a, 304c-304e, in accordance with some embodiments. Some embodiments may additionally render a scan timer graphic 602 (not illustrated in FIGS. 8A-8B) on the display 209 providing feedback to the user (e.g., signifying to the user to keep the imaging system stable and directed at the identifier pattern of interest, notify the user that the identifying information is being detected, enabling the user time to move the imaging system to avoid the extraction of the identifying information, etc.).

In some embodiments the product identifier module can be configured to detect, through a series of one or more images captured by the imaging system, multiple identifier patterns within each of the series of images, and can prioritize one of the identifier patterns over the other of the multiple different identifier patterns as a function of respective distances each of the multiple different identifier patterns is from a reference point within the field of view of the imaging system, and designate the prioritized identifier pattern as the identifier pattern of interest based on the respective distances to the reference point. Similarly, in some implementations, the product identifier module can be configured to detect, through the series of images captured by the imaging system, multiple identifier patterns within each of the series of images prioritize a first identifier pattern based on determining that the first identifier pattern is of a first identifier pattern type. Some embodiments can detect, through the series of images, that a second identifier pattern of the multiple identifier patterns is of the first identifier pattern type. It can be determined that within the series of images the first identifier pattern is closer to a reference point than the second identifier pattern, and the first identifier pattern can be prioritized over the second identifier pattern based on the first identifier pattern being closer to the reference point than the second identifier pattern and being of the first identifier pattern type.

Figure 9:
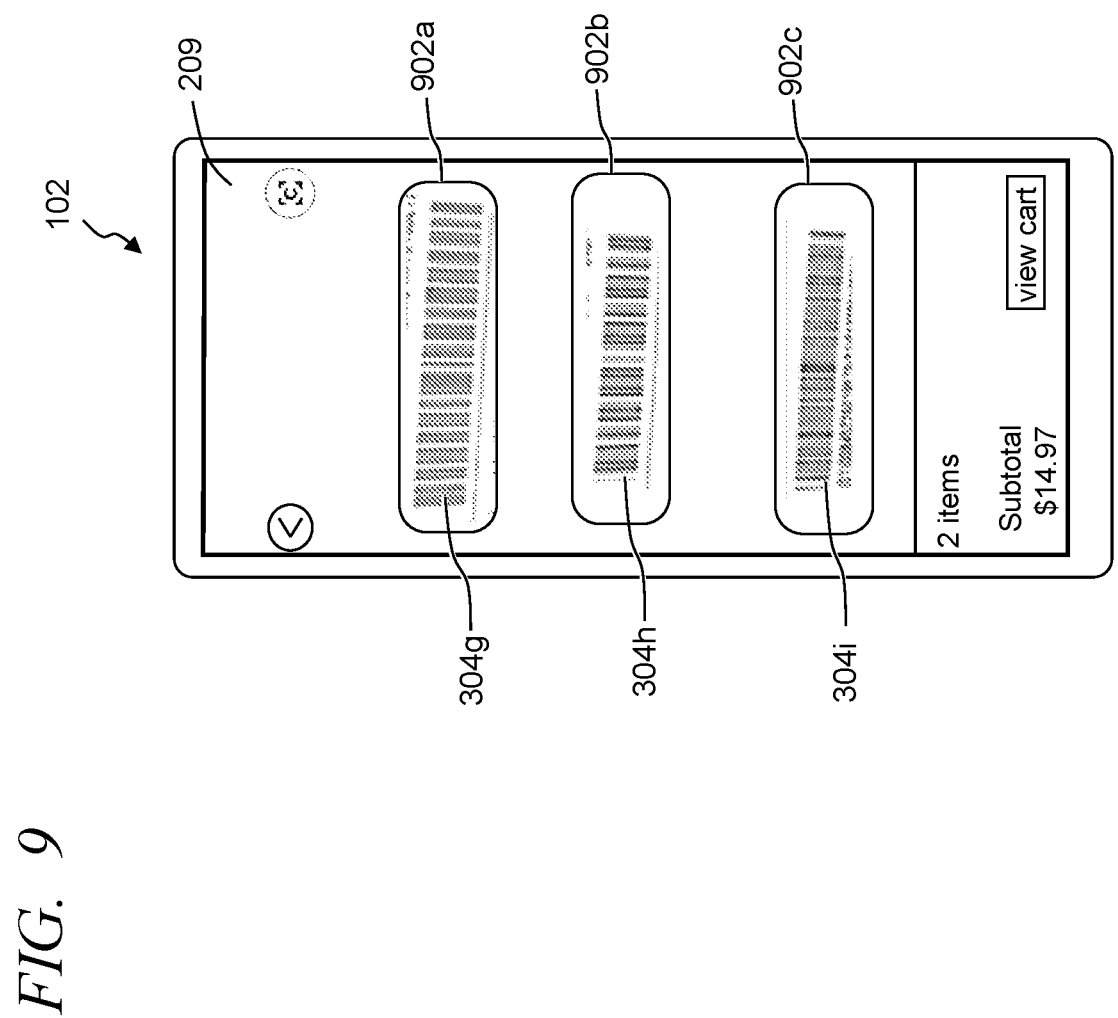
FIG. 9 illustrates a simplified block diagram representation of an exemplary scanner system displaying exemplary images on the display that includes multiple identifier patterns, in accordance with some embodiments.

Some embodiments additionally or alternatively enable the user to select one of multiple different identifier patterns captured in one or more images. The product identifier module 205, in some embodiments, can be configured to identify, from at least a series of multiple images, that multiple different identifier patterns are simultaneously captured within each of the one or more multiple images. The display 209 can be controlled to render a series of multiple images on the display 208 as the respective images are captured. Further, some embodiments render, in each image of the series of images, multiple virtual selection graphics each overlaid proximate to a respective one of the multiple different identifier patterns. FIG. 9 illustrates a simplified block diagram representation of an exemplary scanner system 102 displaying exemplary images on the display 209 that includes multiple identifier patterns 304g-304i, in accordance with some embodiments. Further, multiple virtual selection graphics 902a-902c can be rendered proximate each of the multiple identifier patterns. The displayed virtual selection graphics further operate as options (e.g., through a touchscreen display, one or more buttons, etc.). The product identifier module can detect a selection a one of the multiple identifier patterns (e.g., a first identifier pattern 304g) through a touch by the user on the display 209 proximate a first virtual selection graphic 902a of the multiple virtual selection graphics positioned most proximate to the first identifier pattern 304g. The selection graphic can be substantially any relevant graphic, such as but not limited to an oval, a box, a representation of a target, other such graphics or a combination of two or more of such graphics. Additionally or alternatively, the selection graphic may be an overlay directly over each of the multiple identifier patterns without obscuring the patterns such that a selection of a particular one of the identifier patterns is detected as a selection of the corresponding selection graphic.

Based on the detected selection, in some embodiments, the product identifier module 205 can prioritize the first identifier pattern 304g over the other of the multiple different identifier patterns as a function of detected selection. Some embodiments modify a visual appearance of the first virtual selection graphic 902a in response to the detected selection indicating the first identifier pattern 304g as the identifier pattern of interest. Identifying information can be extracted from the first identifier pattern, and a corresponding product identifier can be obtained corresponding to the identifying information. The identified product can be added to the virtual shopping cart, for example, in response to a user confirming the product. In some embodiments, the scan duration is not applied based on the user making the selection of the relevant identifier pattern.

Figure 10B:
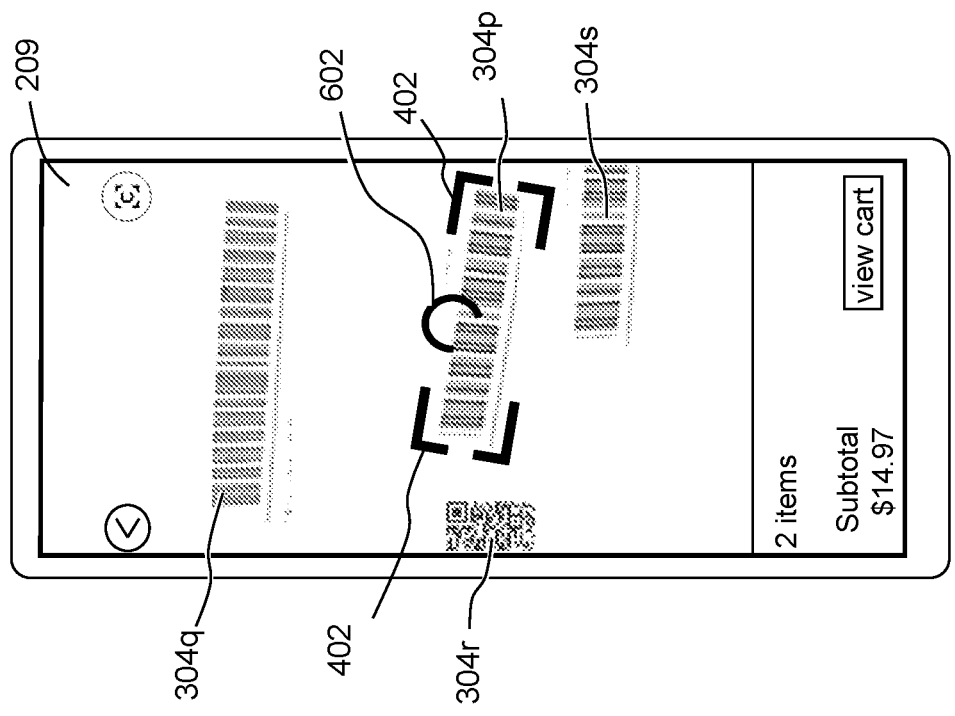
FIGS. 10A-10B illustrate simplified block diagram representations of an exemplary scanner system that is displaying exemplary images on the display, in accordance with some embodiments.
Figure 10A:
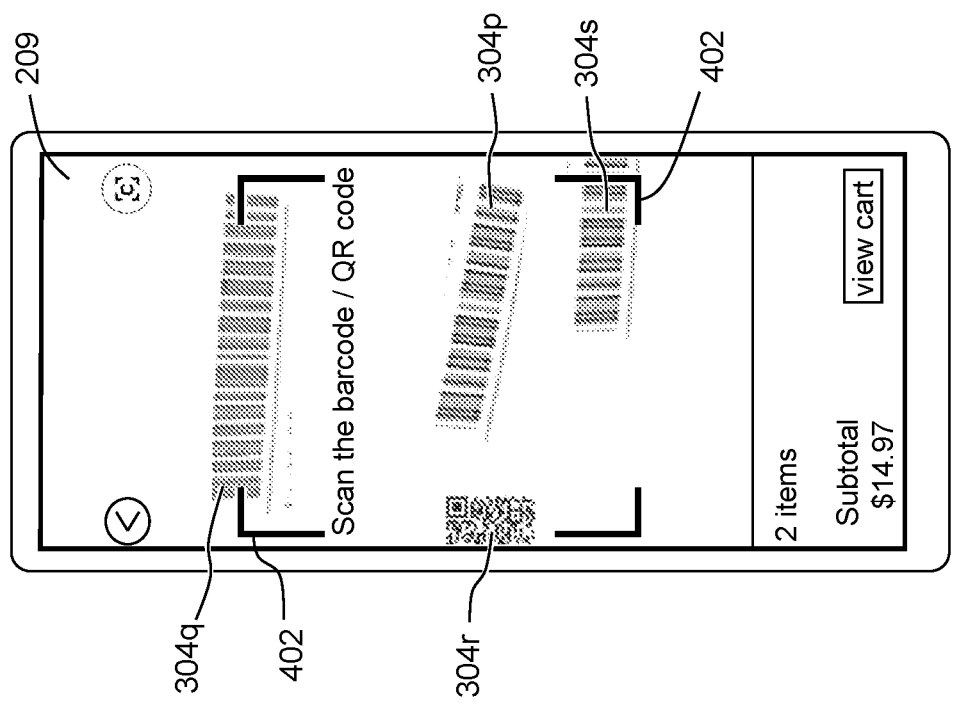

In some embodiments, the product identifier module 205 can be configured to determine whether one or more identifier patterns detected in a sequence of images is/are positioned having a predefined distance relationship to a reference of the field of view and/or display, and/or whether one or more identifier patterns is/are positioned within a distance threshold to a reference of a field of view of the imaging system and/or display of the imaging system 206. FIGS. 10A-10B illustrate simplified block diagram representations of an exemplary scanner system 102 that is displaying exemplary images on the display 209, in accordance with some embodiments. In the exemplary representation of FIG. 10A, the imaging system is capturing images that include multiple identifier patterns 304p-304s. The product identifier module can be configured to identify, from at least a subset of images of a series of images, multiple different identifier patterns 304p-304s simultaneously captured within each of the subset of images. The product identifier module can prioritize a first identifier pattern 304p over the other of the multiple different identifier patterns 304q-304s as a function of respective distances each of the multiple different identifier patterns is from a predefined reference point, such as but not limited to a center of the field of view of the imaging system 206, a center of an predefined area of the display 209, a center of a default orientation and placement of the one or more targeting graphics 402, and/or other such reference point. The multiple identifier patterns 304p-304s may be on a single product or on multiple different products.

FIG. 10B illustrates the exemplary scanner system rendering the targeting graphics 402 overlaid on a captured image, in accordance with some embodiments. The targeting graphics 402 have been adjusted in orientation and size to correspond to and highlight a first identifier pattern 304p as the identifier pattern of interest, of the multiple identifier patterns 304p-304s detected within the field of view. Further, in some embodiments, the first identifier pattern 304p can be identified as the pattern of interest based on the first identifier pattern 304 being closest to a reference point. A relative location of each detected identifier pattern 304p-304s can be evaluated relative to the reference point to identify, for example, which of the multiple identifier patterns is closest to the reference point. Again, in some embodiments, the display 209 can be controlled to render a scan timer graphic 602 overlaid on at least a subset of a series of captured images providing further feedback. The adjustment of the targeting graphics 402 helps the user distinguish between the multiple different identifier patterns 304p-304s, and identify the pattern being considered the pattern of interest. The user can move the scanner system 102 to adjust the field of view of the imaging system to position a different identifier pattern closer to the reference point (e.g., center of the display) when the initial identifier pattern 304*a* is not the identifier pattern that the user is intending to scan.

This evaluation can, for example, be performed by the product identifier module 205 in part to exclude one or more identifier patterns when one or more identifier patterns and/or a portion of an identifier pattern is a threshold distance from a center of a field of view of the imaging system and/or beyond a boundary defined within the field of view of the imaging system. Additionally or alternatively, some embodiments apply a prioritizing of a first identifier pattern 304*p* within a field of view of the imaging system over one or more other identifier patterns that is/are at least partially within the field of view of the imaging system based on the first identifier pattern 304*p* being closer to a reference point (e.g., the center of the field of view of the imaging system) than the one or more other identifier patterns.

The identifier patterns captured within the images captured by the imaging system can continue to be processed to recognize when the user moves away from an initial identifier pattern prior to completing a read and/or extraction (e.g., moved away from the initial identifier pattern prior to completing the countdown of the scan duration). The targeting graphics can similarly be adjusted and/or moved in response to moving away from the initial identifier pattern. In some embodiments, the product identifier module can be further configured to detect an initial identifier pattern through an initial series of multiple images captured by the imaging system. The control circuit can control the display 209 to render the initial series of multiple images on the display 209 as the respective images of the initial series of images are captured while rendering a virtual targeting graphic 402 overlaid proximate the initial identifier pattern indicating the initial identifier pattern as an identifier pattern of interest based on the determined orientation of the initial identifier pattern. The product identifier module can be configured to detect, during the capture of the initial series of images, a change orientation of the imaging system and/or one or more product such that a relative location of a subsequent identifier pattern is changed to be positioned closer to a predefined reference point (e.g., a center of the field of view of the imaging system) than the initial identifier pattern. For example, prior to the expiration of the scan duration while the initial identifier pattern is being evaluated, the subsequent identifier pattern can be shifted (e.g., the user moves the imaging system, the user moves a product, etc.) closer to the predefined reference point. Based on this shift, the subsequent identifier pattern can be prioritized over the initial identifier pattern in response to the detected change of the subsequent identifier pattern being positioned closer to the reference location or area (e.g., center of the field of view of the imaging system). The one or more virtual targeting graphics 402 can be transitioned to be rendered overlaid proximate the subsequent identifier pattern indicating a change that the subsequent identifier pattern is now the identifier pattern of interest while preventing initial identifying information from being extracted from the initial identifier pattern.

Other prioritizations can be applied when multiple identifier patterns are detected. In some embodiments, identifier patterns can be prioritize based on a type of identifier pattern. The product identifier module, in some embodiments, can be configured to identify, from at least a first subset of images of a series of images, a first identifier pattern and at least one additional identifier pattern simultaneously captured with the multiple different identifier patterns within each of the first subset of images. The product identifier module can identify that one or more identifier patterns are a first pattern type and that the at least one additional identifier pattern is a second pattern type different than the first pattern type. The first pattern type can be prioritized over the additional pattern type in prioritizing the first identifier pattern. Additionally or alternatively, some embodiments identify that the first identifier pattern is a first pattern type, and identify that a second identifier pattern of the multiple different identifier patterns is a second pattern type. The first pattern type can be prioritized over the second pattern type in prioritizing the first identifier pattern over a second identifier pattern.

Some embodiments further detect instances where potential reading errors of one or more identifier patterns may occur and/or other potential problems in obtaining the identifying information based on an identifier pattern. In some embodiments, the product identifier module 205 can be configured to detect, through a series of multiple images captured by the imaging system 206, an identifier pattern 304. One or more of the images of the series of images can be evaluated to determine when the identifier pattern is beyond a threshold distance from the imaging system. This identification of distance can be based, in some instances, on a size of the identifier pattern within the field of view of the imaging system relative to a known size based on a pattern type of the identifier pattern, a distance measurement provided by a distance measurement system, a size of the identifier pattern relative to dimensions of packaging of a product with which the identifier pattern is included, other such methods, or a combination of two or more such methods. In response to the determination that the identifier pattern is beyond a threshold distance from the imaging system, identifying information can be prevented from being extracted from the identifier pattern. In some embodiments, the product identifier module can control the display 208 to render on the display the series of multiple images while rendering a virtual distance error feedback graphic overlaid proximate the second identifier pattern while the second identifier pattern is beyond the threshold distance from the imaging system.

Figure 11:
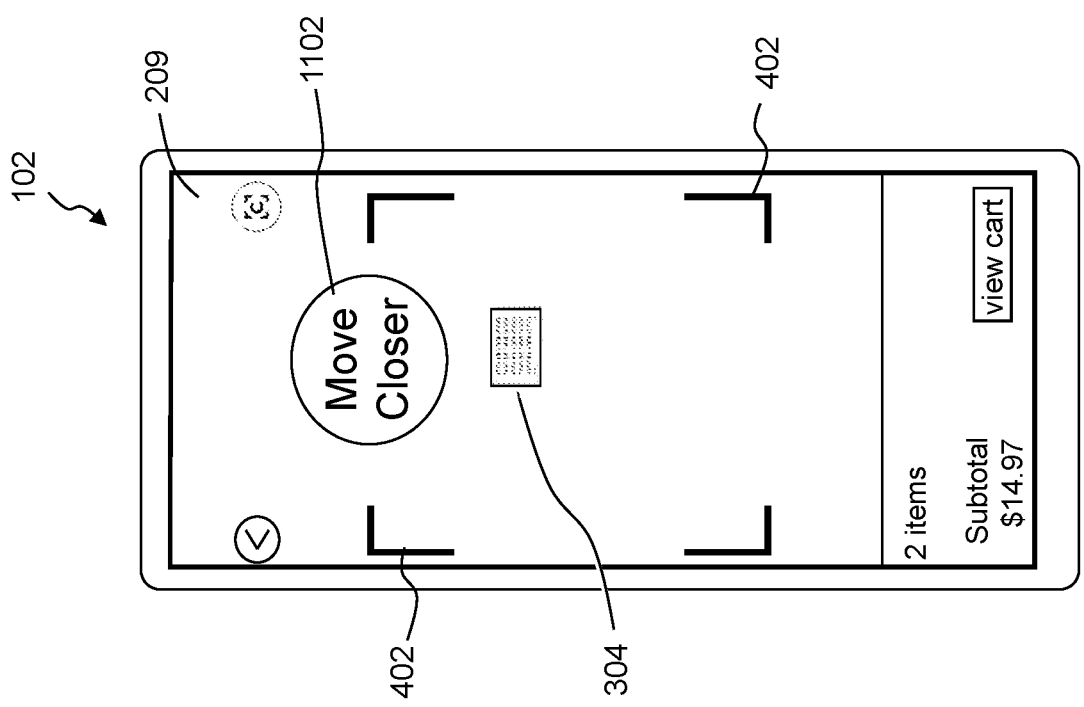
FIG. 11 illustrates a simplified representation of an exemplary scanner system overlaying on captured images a virtual distance error feedback graphic, in accordance with some embodiments.

FIG. 11 illustrates a simplified representation of an exemplary scanner system 102 overlaying on captured images a virtual distance error feedback graphic 1102, in accordance with some embodiments. Again, in response to determining that the identifier pattern 304 is more than a threshold distance from the imaging system, the control circuit can control the display 209 of the scanner system to overlay the distance error feedback graphic 1102 over one or more images of a series of images. In some instances, the scanner system can detect that an identifier pattern 304 is being captured within one or more images, but does not prioritize the identifier pattern and/or initiate a scan of the identifier pattern when the identifier pattern is greater than a threshold distance from the imaging system. This can in part reduce inadvertent scanning of an identifier pattern, such as when the imaging system is actively capturing images while the user is not intending to scan an item. As a non-limiting example, the user may scan a first identifier pattern of a product and then move the scanner system such that the field of view is no longer on the product and instead is generally directed, without specific intent by the user, to a physical shopping cart that includes one or more other items, or directed towards a shelf supporting numerous items. These one or more other items can include identifier patterns that may be detected by the scanning engine, but because of the determined distance from the imaging system the scanning engine can disregard the one or more identifier patterns corresponding to the one or more items in the shopping cart, and/or provide feedback to the user.

Some embodiments prevent obtaining identifying information when there is movement between the imaging system and an identifier pattern that is greater than a movement threshold. The product identifying module 205, in some embodiments, can detect an identifier pattern 304 through a series of multiple images captured by the imaging system, and detect movement, during the capture of the series of multiple images, in excess of a threshold movement range between the imaging system and the identifier pattern. The movement may be caused by movement of the imaging system, movement by the product on which the identifier pattern is positioned, movement of a cart withing which the product is positioned, other such movement, or a combination of two or more of such movements. The identifying information can be prevented from being extracted from the identifier pattern while the detected movement is in excess of the threshold movement range.

In some embodiments, the scanner system 102 may include one or more lights 214 that can be activated in response to detecting an ambient light is insufficient to accurately obtain identifying information from an identifier pattern, in response to a detected glare, other such lighting problems, or a combination of two or more of such lighting problems. The product identifier module, in some embodiments, can be configured to detect a level of light while capturing a series of multiple images captured by the imaging system. It can be determine that the detected level of light while capturing the series of multiple images is below an ambient light threshold, and the light 214 can be activated while capturing one or more images. Additionally or alternatively, some embodiments can determine that the detected level of light while capturing the series of multiple images is in excess of a threshold light level, the system can prevent identifying information from being extracted from the identifier pattern while the detected level of light is in excess of the threshold light level.

Figure 12:
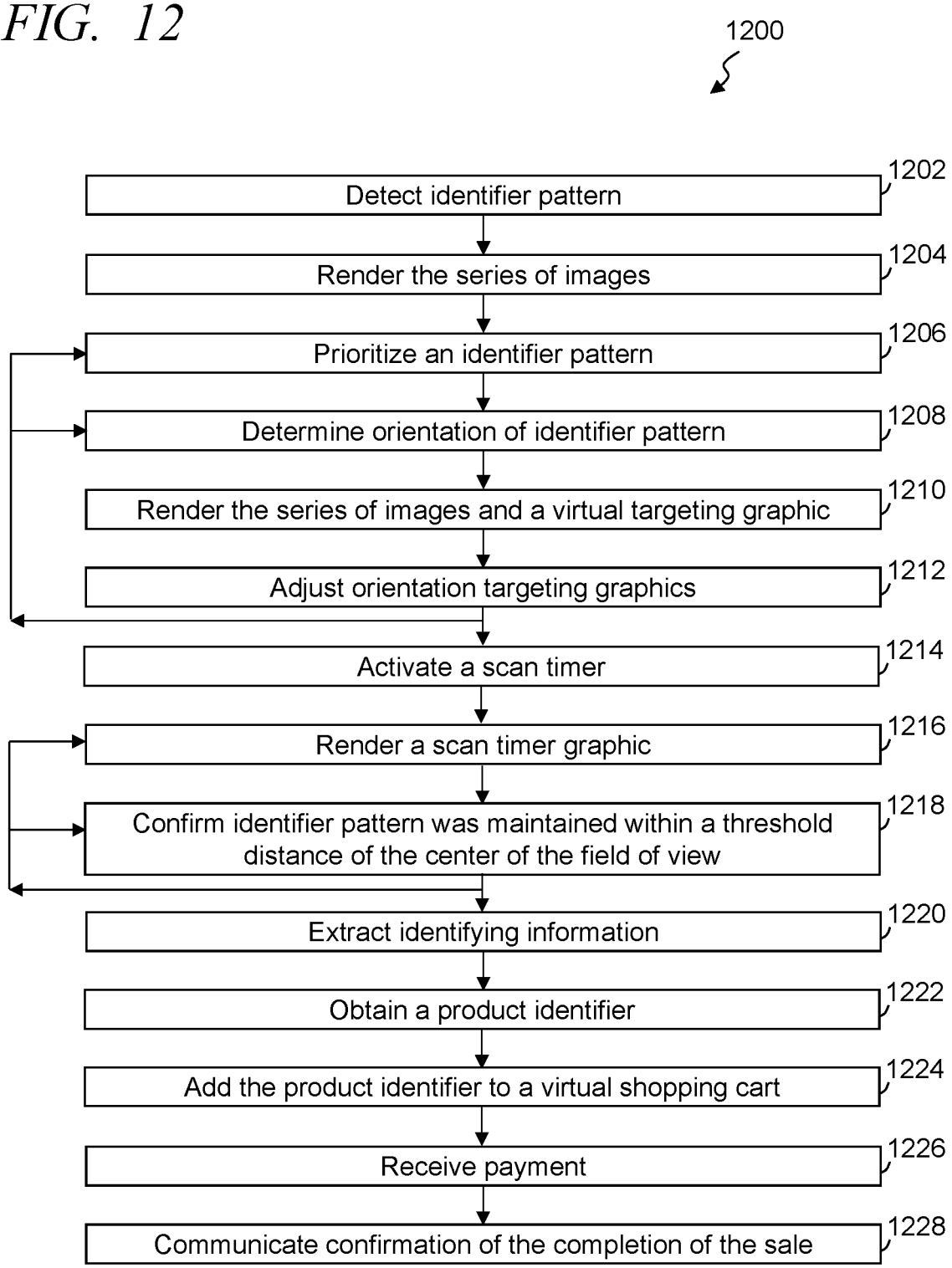
FIG. 12 illustrates a simplified flow diagram of an exemplary process of identifying products through images captured by a scanner system, in accordance with some embodiments.

FIG. 12 illustrates a simplified flow diagram of an exemplary process 1200 of identifying products through images captured by a scanner system 102, in accordance with some embodiments. In step 1202, a machine-readable identifier pattern 304 is detected through a series of images captured by the imaging system. Some embodiments determine that an identifier pattern has a distance relationship to a reference point (e.g., a center of a field of view of the imaging system, a center of an initial area corresponding to and/or indicated by initial positioning of the targeting graphics, a center of the display, etc.). In step 1204, the display 209 can be controlled to render the series of images on the display as the respective images of the series of images are captured.

In some embodiments, 1206 an identifier pattern can be prioritized as an identifier pattern of interest. In some instances, multiple different identifier patterns simultaneously captured within each of a subset of images can be detected. A first identifier pattern may be prioritized, in some embodiments, over the other of the multiple different identifier patterns as a function of one or more factors. For example, an identifier pattern may be prioritized based on respective distances that each of the multiple different identifier patterns is from a reference point, which may be a reference point within the field of view of the imaging system. Some embodiments prioritize an identifier pattern based on a determination that the identifier pattern is of a predefined identifier pattern type. For example, one or more pattern types may be expected and each assigned a priority level. Upon detection of an identifier pattern matching a pattern type, that identifier pattern can be assigned a corresponding priority and/or prioritized relative to one or more other identifier patterns corresponding to one or more different pattern types. Some embodiments, for example, detect through the series of images that an additional identifier pattern of the multiple identifier patterns is of the same identifier pattern type. It can be determined that within the first series of images the first identifier pattern is closer to a reference point than the additional identifier pattern, and the first identifier pattern can be prioritized over the additional identifier pattern based on the first identifier pattern being closer to the reference point than the additional identifier pattern. In some instances, at least one additional identifier pattern simultaneously captured with the multiple different identifier patterns within each of the subset of images can be identify from the subset of images of the series of images. It can be determined that the multiple identifier patterns are a first pattern type and that the at least one additional identifier pattern is a second pattern type different than the first pattern type. The first pattern type can be prioritized over the additional pattern type in prioritizing the first identifier pattern. Additionally or alternatively, some embodiments prioritize one of the identifier patterns based on a relative position, a selection by a user, other such prioritization, or a combination of two or more prioritizations. The prioritization may be interrupted or prevented when motion of the imaging system and/or the item being scanned is in excess of one or more movement thresholds.

In step 1208, an orientation of the identifier pattern 304 is determined relative to an orientation of the display. The determination of orientation can be implemented in response to prioritizing the first identifier pattern, at least when there are multiple identifier patterns. In step 1210, the display 209 can be controlled to render, on the display, the series of images while rendering a virtual targeting graphic 402 overlaid proximate the identifier pattern indicating the identifier pattern as an identifier pattern of interest based on the determined orientation of the identifier pattern and distinguishing the first identifier pattern from the other of the multiple identifier patterns. In some embodiments, the rendering of the targeting graphic 402 includes virtually rendering over the series of images one or more targeting graphics 402 proximate one or more boundaries of the identifier pattern 304. In some instances, optional step 1212 can be implemented where an orientation of the one or more targeting graphics 402 can be adjusted over time consistent with changes in orientation of the identifier pattern 304 of interest over time relative to the display.

In step 1214, a scan timer having a scan duration can be activated. The activation of the scan timer may be activated upon detection of the identifier pattern, while in other instances, the activation may be based on one or more factors, such as confirming the identifier pattern corresponds to a predefined pattern type, movement is less than a threshold, a distance between the imaging system and the identifier pattern is within a threshold distance, ambient light exceeds a threshold, other such factors, or a combination of two or more of such factors. In some implementations, the duration set for the scan duration may be variable. For example, the scan duration may be shorter when only a single identifier pattern is detected in a set of images and longer when more than one identifier pattern are detected, the scan duration may be reduced from a default duration or eliminated when a user selects an identifier pattern (e.g., selects through a touch on the display), increased from a default when movement is detected, other such factors, or a combination of two or more of such factors.

Some embodiments include step 1216 where a scan timer graphic 602 is rendered on the display 209 while displaying at least a subset of the series of images. The scan timer graphic can be overlaid on the subset of the series of images and corresponds to a changing remaining time of the scan duration as the remaining time expires. In step 1218, it can be confirmed that the identifier pattern was maintained within a threshold distance of the center of the field of view over at least a threshold read duration of the scan duration. Some embodiments may prevent the confirmation when motion of the imaging system and/or the item being scanned is in excess of one or more movement thresholds. Similarly, some embodiments may pause or stop the scan duration when motion of the imaging system and/or the item being scanned is in excess of one or more movement thresholds. In step 1220, identifying information can be extracted based on the identifier pattern. In some implementations, the extraction of the identifying information can in part be in response to confirming that the identifier pattern was maintained within the threshold distance of the center of the field of view over at least the threshold read duration of the scan duration.

In step 1222, a product identifier can be obtained corresponding to the identifying information. The product identifier may be obtained local on the scanning system through a local product database, based on a communication of the identifying information to a remote system to provide the product identifier, and/or other such methods. In step 1224, the product identifier can be added to a virtual shopping cart. In some implementations, the virtual shopping cart can be maintained local on the scanning system. Additionally or alternatively, the virtual shopping cart may be maintained separate from the scanning system, such as within a remote customer database, virtual cart server and/or other such remote systems. In step 1226, payment can be received for the products identified in the virtual shopping cart and the sale of these identified products can be completed. The payment can be received through a payment system separate from the scanning system and confirmation communicated to the scanning system. In some implementations, the scanning system enables the user to select a payment method and/or input payment method information (e.g., credit card information, account information, gift card identifier, etc.). The payment method may be used by a remote payment system to acquire payment for the items in the virtual cart. Some systems enables payment for additional items not included in the virtual cart, such as when at a point-of-sale system within a retail store. Some embodiments include step 1228 where confirmation of the completion of the sale can be returned, such as from a remote POS and/or payment system. One or more of the steps of the process 1200 may be repeated any number of times. For example, in some embodiments, steps 1206, 1208, 1210 and/or 1212 can be repeated one or more times while attempting to scan and/or during the scan duration. Such repetition may be based on a schedule, in response to a detected condition (e.g., threshold shift in orientation of identifier pattern, a detected additional identifier pattern, a reprioritization of multiple identifier patterns, etc.), based on a timing expiration, other such factors or a combination of two or more of such factors.

Some embodiments shift from an initial identifier pattern to a different second identifier pattern in response to centering the different identifier pattern within the field of view. The initial identifier pattern may be detected through a previous series of multiple images captured by the imaging system. One or more identifier patterns may be detected in the previous series of images. An initial identifier pattern may be prioritized based on the previous series of images as an initial identifier pattern of interest. The display can be controlled to render the previous series of multiple images on the display as the respective images of the previous series of images are captured and further rendering a virtual targeting graphic 402 overlaid proximate the initial identifier pattern indicating the initial identifier pattern as an identifier pattern of interest. A change can be detected during the capture of a subsequent series of images of the second identifier pattern being positioned closer to a reference point than the initial identifier pattern. The second identifier pattern can be prioritized over the initial identifier pattern in response to the detected change of the second identifier pattern being positioned closer to the reference point. The rendering of the virtual targeting graphic 402 can be transitioned to be overlaid proximate the second identifier pattern indicating a change that the second identifier pattern is the identifier pattern of interest while preventing identifying information from being extracted from the initial identifier pattern.

In some instances, a second identifier pattern can be detect through a second series of multiple images captured by the imaging system. It can be determine that the second identifier pattern is beyond a threshold distance from the imaging system. The extraction of identifying information from the second identifier pattern can be prevented while the second identifier pattern is beyond the threshold distance from the imaging system. Some embodiments further render, on the display, the second series of multiple images while rendering a virtual distance error feedback graphic 1102 overlaid proximate the second identifier pattern while the second identifier pattern is beyond the threshold distance from the imaging system. Additionally or alternatively, some embodiments detect a second identifier pattern through a second series of multiple images captured by the imaging system. When movement between the imaging system and the second identifier pattern is detected during the capture of the second series of multiple images, the movement can be evaluated to identify when the movement is in excess of a threshold movement range, and prevent second identifying information from being extracted from the second identifier pattern while the detect movement is in excess of the threshold movement range.

Some embodiments detect a level of light while capturing a series of multiple images captured by the imaging system, and determine that the detected level of light while capturing the series of multiple images is in excess of a threshold light level. When the light is in excess of the threshold light level some embodiments prevent identifying information from being extracted from an identifier pattern while the detected level of light is in excess of the threshold light level.

Further, some embodiments identify, from at least a series of multiple images, multiple different identifier patterns simultaneously captured within each of the series of multiple images. The display can be controlled to render the series of multiple images on the display as the respective images of the series of images are captured while further rendering, in each image of the series of multiple images, multiple virtual selection graphics 902 each overlaid proximate to a respective one of the multiple different identifier patterns. A selection can be detected of a particular identifier pattern of the multiple different identifier patterns through a touch by the user on the display proximate a first virtual selection graphic of the multiple virtual selection graphics positioned most proximate to the particular identifier pattern. The particular identifier pattern can be prioritized over the other of the multiple different identifier patterns as a function of detected selection. A visual appearance of the virtual selection graphic can be modified in response to the detected selection indicating the identifier pattern as an identifier pattern of interest. Identifying information can be extracted from the identifier pattern, a product identifier corresponding to the identifying information can be obtained and the second product identifier can be added to the virtual shopping cart.

Figure 13:
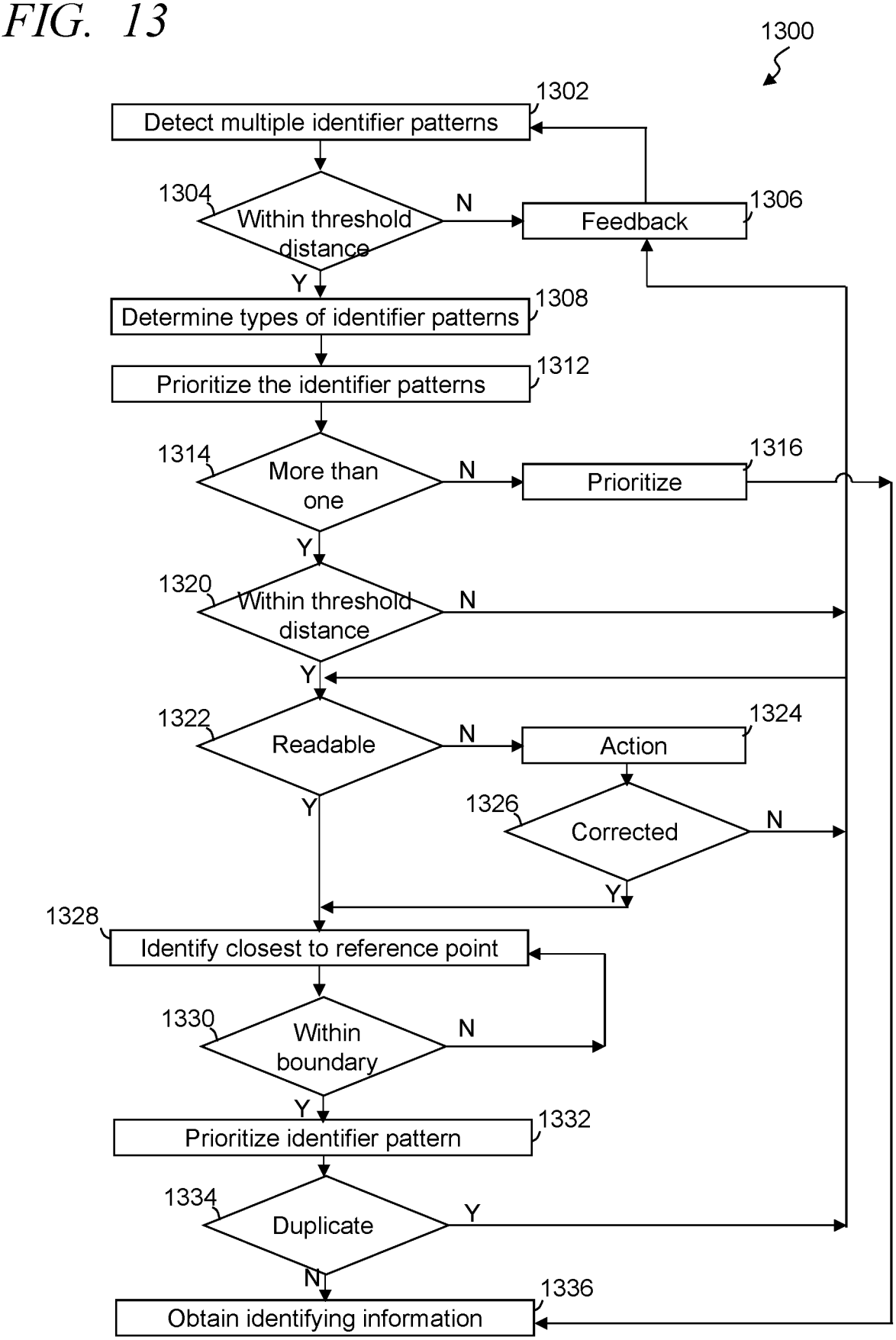
FIG. 13 illustrates a simplified flow diagram of a process of prioritizing identifier patterns, in accordance with some embodiments.

FIG. 13 illustrates a simplified flow diagram of a process 1300 of prioritizing identifier patterns, in accordance with some embodiments. By prioritizing identifier patterns some embodiments limit scanning of unintended identifier patterns, limit duplicate scans of identifier patterns, and other benefits. In step 1302, the product identifier module 205 can be configured to detect when multiple identifier patterns are being simultaneously captured in each of a series of images (for example, identifier patterns 304a-304e of FIGS. 8A-8B and/or 304q-304s of FIGS. 10A-10B). Some embodiments include step 1304 where it can be determined whether at least one of the multiple identifier patterns 304 is within a threshold distance of a default reference point, within a defined boundary of the display, within a limited area of the field of view of the imaging system, other such location limits or a combination of two or more of such limits. When an identifier pattern is not within the threshold distance, some embodiments advance to step 1306 where feedback can be provided to the user. For example, the display can be controlled to display information and/or instructions, which may be text, graphic representations, animation, and/or other such feedback. Additionally or alternatively, other feedback can be provided such as but not limited to audio, vibration, and/or other such feedback. In other embodiments, feedback is not provided and the process and scanner system await the detection of one or more identifier patterns 304 to be within the threshold distance.

The process 1300 can include step 1308 where a pattern type can be identified and/or determined for each identifier patterns of the multiple different identifier patterns. In some implementations, when a pattern type cannot be identified, the corresponding identifier pattern can be disregarded as not an identifier pattern. In step 1312, the multiple identifier patterns can be prioritized based on their respective pattern type. As introduced above, some embodiments designate one or more identifier patterns as having a greater priority and/or more likely to correspond to product identifying information than other types of identifier patterns. In step 1314, it can be determined whether there is more than one identifier pattern that is assigned a highest priority. In one non-limiting example, two identifier patterns may be detected that have the same identifier pattern type, and as such may be prioritized at the same level. In another non-limiting example, two identifier patterns may be detected that have different identify pattern types (e.g., a barcode, and a QR code), but both identifier pattern types may have the same priority level. When it is determined in step 1314 that one of the detected identifier pattern is assigned a highest priority, the process in some implementations can advance to step 1316 where that identifier pattern can be prioritized as the identifier pattern of interest and the scan can continue relative to that prioritized identifier pattern (e.g., initiating the scan time, displaying adjusted targeting graphics adjacent the identifier pattern of interest, and/or other such actions). For example, the process may advance to step 1334 to obtain identifying information based on the prioritized identifier pattern of interest.

Some embodiments include step 1320 where the relative locations of each of the multiple identifier patterns can be evaluated. Some embodiments determine whether at least one of the multiple identifier patterns 304 is within a threshold distance of a default reference point, within a defined boundary of the display, within a limited area of the field of view of the imaging system, other such location limits or a combination of two or more of such limits. When none of the identifier patterns are not within the threshold distance, some embodiments advance to step 1306 where feedback can be provided to the user. In other embodiments, feedback is not provided and the process and scanner system await the detection of one or more identifier patterns 304 to be within the threshold distance. In step 1322 one or more identifier patterns, and typically one or more patterns within the threshold distance, can be evaluated to confirm at least one of the patterns is readable. As some non-limiting examples, the images can be evaluated to determine whether an image and/or pattern has a blur greater than a blur threshold, whether the one or more identifier patterns are too far from the imaging system, whether ambient light is too low, whether there is an excess glare interfering with one or more identifier patterns, whether there is motion in excess of one or more thresholds, other such conditions or a combination of two or more of such conditions. Some embodiments implement one or more timers that can be used to prevent scanning and/or activate other actions. Such timers can implement one or more timeout durations that may prevent scanning when one or more corresponding conditions exist for the respective timeout durations. Some non-limiting examples of such timers can include, but are not limited to motion in excess of a motion threshold period of time, distance in excess of a threshold distance for more than a distance threshold period of time, undetected and/or unrecognized identifier pattern and/or identifier pattern that does not comply with one or more expected identifier patterns are detected for more than a symbology threshold period of time, other such conditions, or a combination of two or more of such conditions.

When an identifier pattern cannot be accurately read, some embodiments advance to step 1324 to initiate one or more actions. Whether the process advances to step 1324 can depend on the type of problem interfering with the reading of the identifier pattern. Some problems cannot be corrected. Some non-limiting examples of actions can include but are not limited to controlling the imaging system to adjust a focus, zooming in, zooming out, activating an additional or alternative imaging system of the scanner system, adjusting lighting, other such actions or a combination of two or more of such actions. In step 1326 it can be determined whether the action corrected, improved and/or resolved the issue such that one or more of the identifier patterns are readable. In some embodiments, the steps 1322, 1324 and 1326 can be repeated one or more times to address one or more issues. One or more limits may be defined for the number of repetitions. Additionally or alternatively, the process can advance to step 1306 to provide feedback to the user and/or return to a default state to await images that include one or more identifier patterns.

In some implementations the process implements step 1328 to determine which of the multiple identifier patterns having the highest priority is closest to a reference point. The reference point can be a center of an area outlined by default positions of targeting graphics, a center of the field of view of the imaging system, a center of an area defined within a boundary of the field of view, and/or other such reference points. Similarly, the evaluation of the relative location of the respective identifier patterns relative to the reference point can be determined from a center of an area occupied in the display by the respective identifier pattern, a closest portion of the identifier pattern to the reference point, a furthest point of the identifier pattern from the reference point, other such relative locations or a combination of two or more of such relative location parameters. In some embodiments, the product identifier module can be configured to detect, through a series of images, multiple identifier patterns within each of the series of images, and can prioritize the first identifier pattern over the other of the multiple different identifier patterns as a function of respective distances each of the multiple different identifier patterns is from a reference point within the field of view of the imaging system, and designate the first identifier pattern as the identifier pattern of interest based on the respective distances to the reference point. Additionally or alternatively, the product identifier module can be configured to determine that within the series of images the first identifier pattern is closer to the reference point or area than the other of the multiple identifier patterns, and designate the first identifier pattern as the identifier pattern of interest based on the first identifier pattern being closer to the reference point than the other of the multiple identifier patterns.

Some embodiments include step 1330 where the identifier pattern having the threshold relationship with the reference point can be evaluated to confirm that the identifier pattern is within a boundary of the field of view of the imaging system and/or a predefined area of the display. For example, some embodiments may confirm that the entire identifier pattern is displayed on the display, displayed within an area of the display limited by a border around the perimeter of the display, and/or other such positioning, prior to attempting to acquire identifying information. When the identifier pattern that has the threshold relationship with the reference point is not within the limited area, some embodiments return to step 1328 to identify a different identifier pattern that may be within the limited area. In other instances, the process may advance to step 1306 to provide feedback, errors, warnings, instructions, etc. In other instances some embodiments return to step 1314 to evaluate other identifier patterns of lower priority.

In step 1332 the identifier pattern can be assigned a highest priority and/or the identifier pattern of interest. Some embodiments include optional step 1334 where the prioritized identifier pattern can be evaluated to determine whether that identifier pattern was previously scanned and/or previously scanned within a duplicate scan threshold duration of time. In such instances, some embodiments can deprioritize and/or disregard this identifier pattern as a duplicate. Additionally or alternatively, feedback may be provided to the user to obtain confirmation whether the identifier pattern is to be rescanned (e.g., user intends to acquire multiple of the same product) or disregarded, and/or to notify the user of the duplicate scan. This can limit inadvertent duplicate scans and/or provide the user with information to allow the user to remove the duplicate from the virtual cart when an inadvertent scan occurred.

In step 1336 a process can be initiated to obtain identifying information based on the priority identifier pattern. For example, a scan duration threshold may be defined and/or selected, which as described above can be dependent on one or more factors, the scan timer can be activated, an orientation of the prioritized identifier pattern can be determined, the display can be controlled to render one or more targeting graphics 402 and/or adjust an orientation of one or more targeting graphics as described above and further below, movement of the prioritized identifier pattern can be tracked over time, the one or more targeting graphics can be adjusted over time based on the movement of the prioritized identifier pattern, the display can be controlled to display one or more scan timer graphics 602, other feedback information and/or graphics can be provided, identifier information can be extracted and/or decoded from the identifier pattern (e.g., at the termination of the scan timer duration threshold), other actions can be implemented, or a combination of two or more of such actions. Again, some embodiments may enable the user to select one of the multiple identifier patterns 304. As such some embodiments include an optional step to define selectable options corresponding to one or more of the identifier patterns and determine whether one of the options is selected. When one of the identifier patterns is selected, the prioritization defined through the process 1300 can be overridden, and/or the process can be interrupted and not completed when the selection is detected as the process 1300 is being implemented. For example, an optional step may be defined to establish the options corresponding to one or more of the multiple identifier patterns. This can allow the detection of a selection of one of the options and interrupt the process when a selection is detected and/or cause the process to advance directly to step 1332 and/or step 1336. Some embodiments may further evaluate the obtained identifying information to determine whether that identifier information was previously obtained and/or previously obtained within a duplicate scan threshold duration of time. This can be similar to step 1334 using the obtained identifying information. Some of the steps and/or one or more sets of steps may be repeated, and/or continuously implemented. For example, some embodiments continue to implement step 1314 to detect multiple identifier patterns, step 1320 to ensure that the identifier pattern is maintained within the threshold distance or at least maintained within the threshold distance for at least a threshold portion of the scan duration (which would allow some movement while still identifying the identifier of interest), step 1328 in reprioritizing when a second identifier pattern is moved to be a closest to the reference point (which may include an additional step of confirming that the second identifier pattern is maintained closest for a minimum duration before reprioritizing to the second identifier pattern in order to avoid rapid switching between identifier patterns based on small movements of the camera and/or product(s), etc.), and/or other steps.

Figure 14:
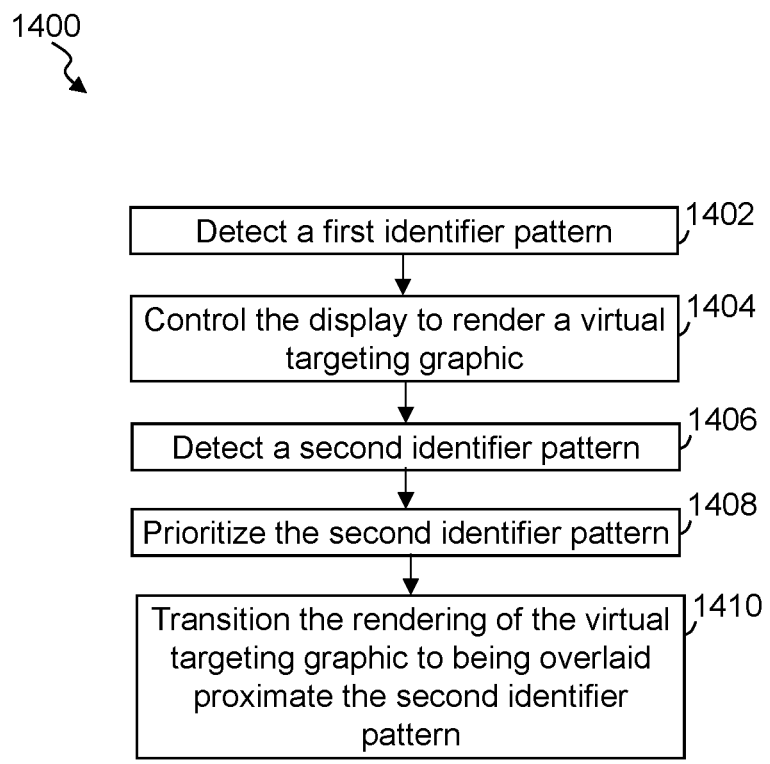
FIG. 14 illustrates a simplified flow diagram of an exemplary process of reprioritizing identifier patterns, in accordance with some embodiments.

Some embodiments continue to evaluate images while awaiting the scan duration to expire to detect one or more other identifier patterns that may be determined to have a higher priority and/or that a user intends to scan instead of an initial identifier pattern that was prioritized. FIG. 14 illustrates a simplified flow diagram of an exemplary process 1400 of reprioritizing identifier patterns, in accordance with some embodiments. In step 1402, a first identifier pattern can be identified and/or prioritized. In step 1404, the display can be controlled to render one or more virtual targeting graphic 402 overlaid proximate the first identifier pattern. In step 1406, a second identifier pattern may be detected and the prioritization evaluation performed (e.g., process 1300) to identify that the second identifier pattern is to be prioritized over the first identifier pattern. The re-prioritization can occur during the scan duration, while extracting identifying information and/or after obtaining identifying information of the first identifier pattern. As one non-limiting example, it may be determined that the imaging system is moved during the scan duration and the second identifier pattern has been positioned closer to a reference point. In step 1408, the second identifier pattern can be prioritized over the first identifier pattern. In step 1410, the virtual targeting graphics 402 can be moved and/or transitioned to be overlaid proximate the now higher prioritized second identifier pattern.

Figure 15:
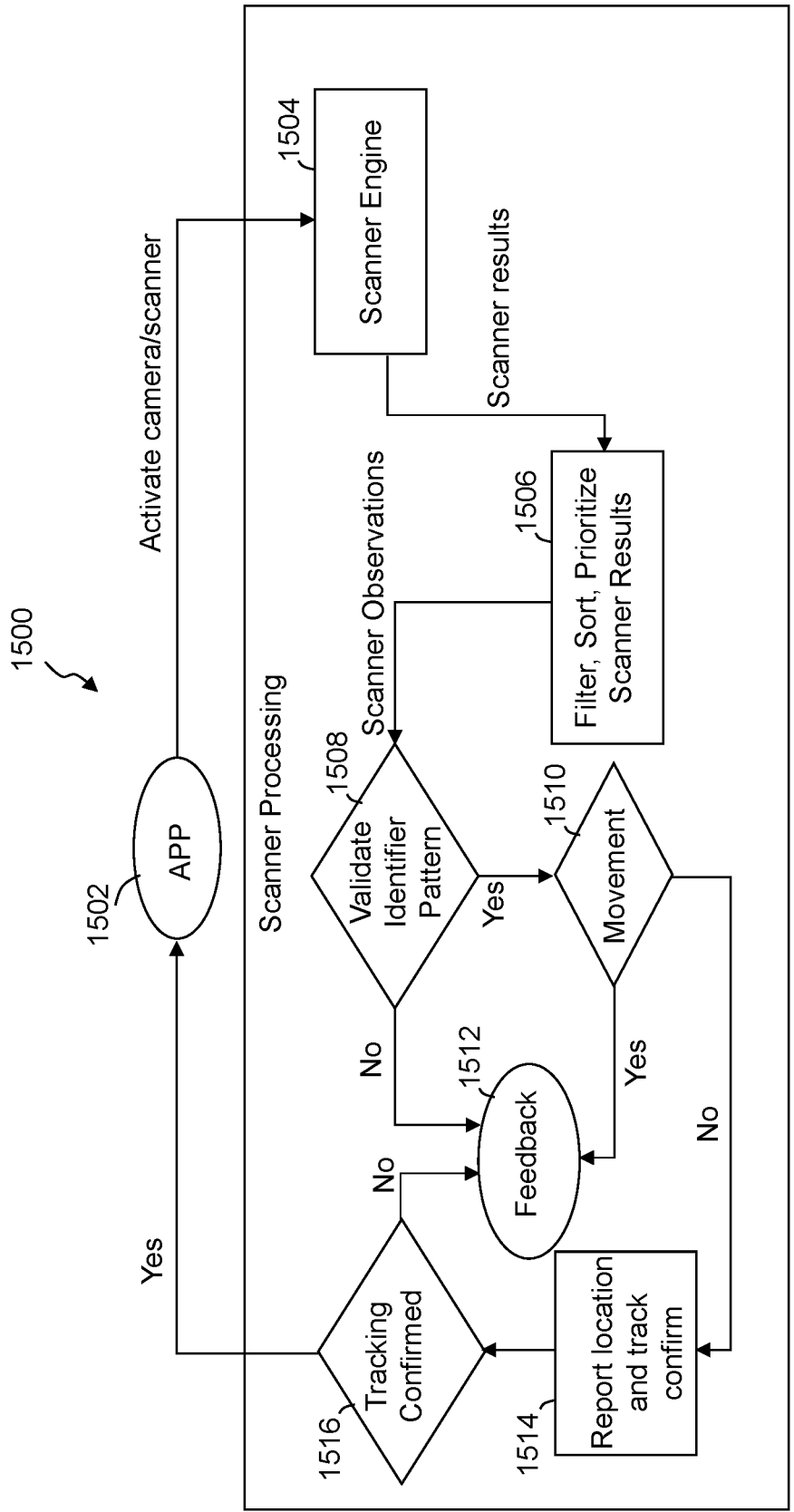
FIG. 15 illustrates a simplified flow diagram of an exemplary process of obtaining product identifying information based on a scan, in accordance with some embodiments.

FIG. 15 illustrates a simplified flow diagram of an exemplary process 1500 of obtaining product identifying information based on a scan, in accordance with some embodiments. In step 1502 the scanning can be initiated. In some embodiments, the scanning can be initiated through an option displayed through an APP 104 executed by the scanner control circuit. The initiation can activate one or more cameras and/or images from one or more cameras can be forwarded to a scanner engine. In step 1504, the scanner engine evaluates the images to identify one or more identifier patterns and/or extract information from one or more identifier patterns. In some embodiments, the scanner engine can be implemented in part through third-party software, such as software provided by Digimarc Corporation, of Beaverton, Oregon, to capture information from the respective identifier pattern.

In some embodiments the captured information may be filtered, sorted and/or prioritized in step 1506. For example, information may be hashed and evaluated relative to known hashing to confirm an accuracy of the information, exclude information from one or more types of identifier patterns, prioritize based on different types of patterns detected, exclude when insufficient information is obtained, other such filtering, sorting and/or prioritizing, or a combination of two or more of such filtering, sorting and prioritizing.

Some embodiments include step 1508 where relevant information can be evaluated, the identifier pattern can be evaluated, and/or one or more conditions and/or other factors can be considered to determine whether further processing can continue. For example, some embodiments determine whether a size of the identifier pattern captured is too small, whether the identifier pattern is too far away, evaluate a relative location of an identifier pattern within an image relative to one or more reference points or areas, and/or other such conditions and/or factors. Some embodiments include step 1510 where it is determined whether there is movement greater than a threshold. Other conditions and/or factors may additionally or alternatively be evaluated in some implementations, such as but not limited to evaluating a distance between the imaging system and the one or identifier patterns relative to one or more thresholds, evaluating ambient light relative to one or more thresholds, evaluating pattern types, applying one or more prioritizations, other such evaluations, or a combination of two or more of such evaluations. In some embodiments, when further processing cannot continue from steps 1508 and/or 1510 the process 1500 may continue to step 1512 where one or more actions can be implemented based on the factors and/or conditions inhibiting further processing (e.g., generate an error message, modify a color, size and/or shape of targeting graphics, generate audio alert, control the display and/or audio to provide instructions (e.g., move camera closer, stop movement, etc.), activate a light, activate a different or additional imaging system, etc.), other such actions, or a combination of two or more of such actions.

When processing can continue, the process 1200 in some embodiments advances to step 1514 where a relative location of the identifier pattern is determined, an orientation of the identifier pattern is determined, targeting graphics can be displayed based on orientation, scan timer can be activated, and/or other tracking processing can be implemented. In step 1516 it can be confirmed that one or more tracking conditions were satisfied (e.g., scan duration expired, movement was maintained below a threshold, lighting was within a threshold range, and/or other such factors) and identifying information can be obtained based on the identifier pattern. When tracking is not confirmed the process 1200 can, in some instances, proceed to step 1512 where one or more actions can be implemented based on the issue or issues preventing the tracking. In some embodiments, when the tracking is completed and identifying information is obtained, the process returns the identifying information to the retail application for use, such as controlling the display to provide product information to the customer, requesting confirmation of the product identification, incorporating product information into a virtual cart, other such actions or a combination of two or more of such actions.

Figure 16:
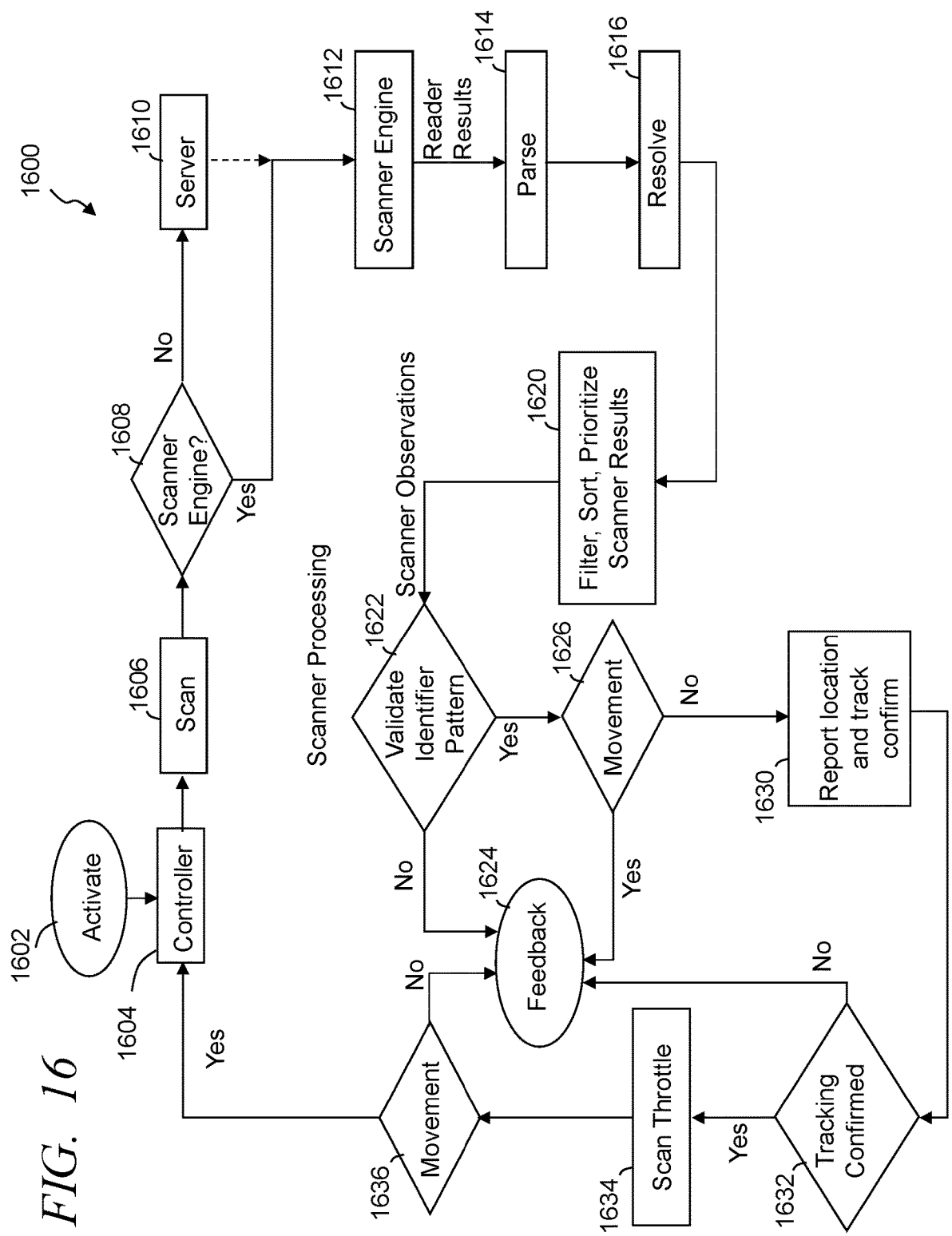
FIG. 16 illustrates a simplified flow diagram of an exemplary process of obtaining product identifying information through scanning, in accordance with some embodiments.

FIG. 16 illustrates a simplified flow diagram of an exemplary process 1600 of obtaining product identifying information through scanning, in accordance with some embodiments. In step 1602 the scanning can be activated. In step 1604 the scan control circuit can be triggered to activate the imaging system to capture a series of images. In step 1606 the imaging system captures images for processing. Some embodiments include step 1608 where it is determined whether images are to be processed location on the scanner system 102 or remote, such as at a remote server 1610. Images can be processed in step 1612 through a scanner engine where identifier information can be obtained from one or more identifier patterns. Some embodiments include step 1614 where some of the information can be parsed and/or ordered. In step 1616 some of the data may be excluded and/or resolved through one or more processes. Some embodiments include step 1620 where filtering, sorting and/or prioritization can be performed on the scanner results information. This can include excluding some information that is obtained from outside a predefined area of the field of view, excluding some types of information, prioritizing some types of information, and/or other such processing.

In step 1622, extracted information can be evaluated relative to one or more conditions and/or other factors to determine whether further processing can continue. For example, some embodiments determine whether a size of the identifier pattern captured is too small, whether the identifier pattern is too far away, evaluate a relative location of an identifier pattern within an image relative to one or more reference points or areas, and/or other such conditions and/or factors. When it is determined processing should not continue the process 1600 in some embodiments continues to step 1624 to provide feedback to the user, adjust the scanner system, activate lighting, etc.

Some embodiments include step 1626 where it can be determined whether there is movement of the scanner system and/or movement between the imaging system and the identifier pattern that is greater than one or more thresholds. When the movement is greater than the threshold some embodiments shift to step 1624 to provide feedback and/or implement one or more actions (e.g., generate an error message, modify a color, size and/or shape of targeting graphics, generate audio alert, control the display and/or audio to provide instructions (e.g., move camera closer, stop movement, etc.), activate a light, activate a different or additional imaging system, etc.), other such actions, or a combination of two or more of such actions.

In step 1630, a relative location of the identifier pattern can be determined, an orientation of the identifier pattern can be determined, targeting graphics can be displayed based on orientation, scan timer can be activated, and/or other tracking processing can be implemented. In step 1632, it can be confirmed that one or more tracking conditions were satisfied (e.g., scan duration expired, lighting was within a threshold range, and/or other such factors). When tracking is not confirmed the process 1200 can, in some instances, proceed to step 1624 where one or more actions can be implemented based on the issue or issues preventing the tracking. Some embodiments include step 1634 where scan throttling can be applied providing a delay period of time to disregard changes that occur for less than one or more threshold periods of time and/or disregards changes that are less than a threshold amount. For example, as the imaging system moves that movement may be less than the movement threshold to allow continued processing but such movement does not cause a recalibration and/or movement of the targeting graphics or a shift to a different identifier pattern when that change is less than the threshold amount. This avoids rapid responses and allows for more consistency and reliability.

Some embodiments include optional step 1636 where movement continues to be evaluated over the scan duration. When movement is detected that has a predefined relationship with one or more movement thresholds, the process provides feedback in step 1624 and/or implements one or more actions. When the scan is complete the relevant identifying information obtained based on the processing of the identifier pattern can be provided back to the scanner control circuit and/or application to take further action (e.g., add to virtual cart, render details about the identified product, etc.).

The scanner tracking provided by some embodiments enables scanning and tracking of one or more identifier patterns simultaneously, and/or enables the scanning of a single identifier pattern when multiple patterns are present. The targeting graphics can highlight the identifier pattern(s) of interest, and some embodiments provide the user with options to select one or more products to quickly add to a virtual cart. The display can be controlled based on the identification of the product to provide the user with useful product information (e.g., price, discount/promotion information, product reviews, etc.) when a product is identified from the scan of an identifier pattern. Further, feedback can be provided to the user through the display and/or audio to improve scanning and/or when an invalid identifier pattern is detected (e.g., shelf code is scanned instead of a product identifier pattern when multiple identifier patterns are captured in an image). Actions can be taken automatically and/or from user input to adjust and/or improve the imaging system view such as implementing zoom, focus adjustment, exposure adjustment, activating/deactivating lighting, etc. Further, some embodiments provide scanning of identifier information that is not barcodes or other such codes and/or when some products do not include such a code, such as but not limited to through text capture, color pattern detection, etc. Some embodiments can be implemented through augmented reality systems (e.g., glasses, etc.), such as detecting user feedback through eye blink and/or movement, audio responses, etc.

Figure 17:
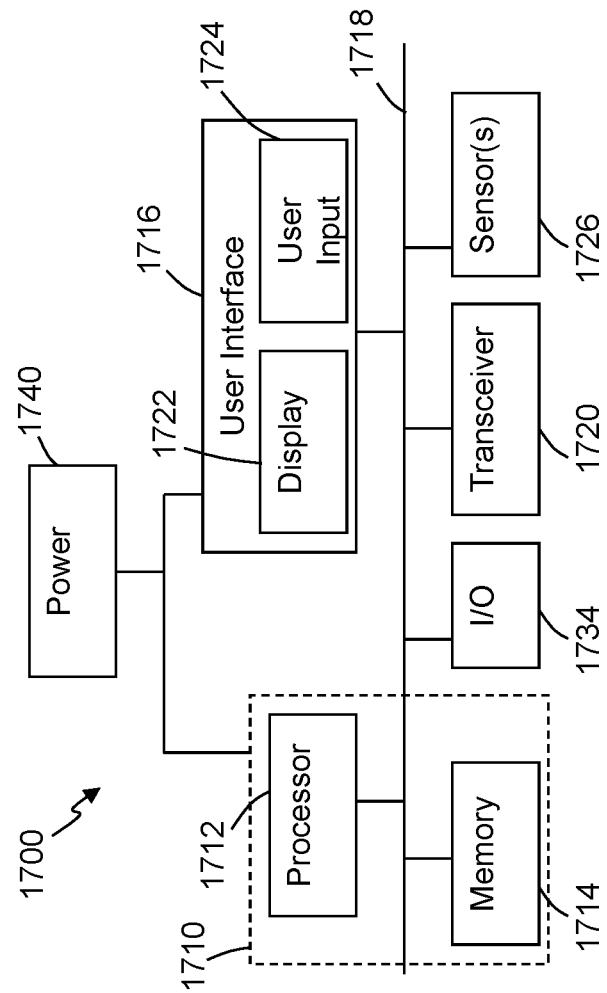
FIG. 17 illustrates an exemplary system for use in implementing methods, techniques, devices, apparatuses, systems, servers, and sources enabling product identification, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 17 illustrates an exemplary system 1700 that may be used for implementing any of the components, circuits, circuitry, systems, functionality, apparatuses, processes, or devices of the exemplary product identifying system 100, the scanner systems 102, the scanner control circuit 202 and/or other above or below mentioned systems or devices, or parts of such circuits, circuitry, functionality, systems, apparatuses, processes, or devices. However, the use of the system 1700 or any portion thereof is certainly not required.

By way of example, the system 1700 may comprise one or more control circuits or processor modules 1712, one or more memory 1714, and one or more communication links, paths, buses or the like 1718. Some embodiments may include one or more user interfaces 1716, and/or one or more internal and/or external power sources or supplies 1740. The control circuit 1712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1712 can be part of control circuitry and/or a control system 1710, which may be implemented through one or more processors with access to one or more memory 1714 that can store instructions, code and the like that can be implemented by the control circuit and/or processors to implement intended functionality. In some applications, the control circuit and/or memory may be distributed providing distributed and/or redundant processing and functionality. Again, the system 1700 may be used to implement one or more of the above or below, or parts of, components, circuits, systems, processes and the like.

The user interface 1716 can allow a user to interact with the system 1700 and receive information through the system. In some instances, the user interface 1716 includes a display 1722 and/or one or more user inputs 1724, such as buttons, touch screen, track ball, keyboard, mouse, etc., which can be part of or wired or wirelessly coupled with the system 1700. Typically, the system 1700 further includes one or more communication interfaces, ports, transceivers 1720 and the like allowing the system 1700 to communicate over a communication bus, a distributed computer and/or communication network 108 (e.g., a local area network (LAN), the Internet, wide area network (WAN), etc.), communication link 1718, other networks or communication channels with other devices and/or other such communications or combination of two or more of such communication methods. Further the transceiver 1720 can be configured for wired, wireless, optical, fiber optical cable, satellite, or other such communication configurations or combinations of two or more of such communications. Some embodiments include one or more input/output (I/O) ports 1734 that allow one or more devices to couple with the system 1700. The I/O ports can be substantially any relevant port or combinations of ports, such as but not limited to USB, Ethernet, or other such ports. The I/O interface 1734 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1726 to provide information to the system and/or sensor information that can be communicated to another component, such as a central control system, an inventory system, point-of-sale system, delivery system, a delivery vehicle, etc. The sensors can include substantially any relevant sensor, such as distance measurement sensors (e.g., optical units, sound/ultrasound units, etc.), accelerometers, gyroscopes, light detectors, other such sensors or a combination of two or more of such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1700 comprises an example of a control and/or processor-based system with the control circuit 1712. Again, the control circuit 1712 can be implemented through one or more processors, controllers, central processing units, logic, software and the like. Further, in some implementations the control circuit 1712 may provide multiprocessor functionality.

The memory 1714, which can be accessed by the control circuit 1712, typically includes one or more processor-readable and/or computer-readable media accessed by at least the control circuit 1712, and can include volatile and/or nonvolatile media, such as RAM, ROM, EEPROM, flash memory and/or other memory technology. Further, the memory 1714 is shown as internal to the control system 1710; however, the memory 1714 can be internal, external or a combination of internal and external memory. Similarly, some or all of the memory 1714 can be internal, external or a combination of internal and external memory of the control circuit 1712. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 108. The memory 1714 can store code, software, executables, scripts, data, content, lists, programming, programs, log or history data, user information, customer information, product information, and the like. While FIG. 17 illustrates the various components being coupled together via a bus, it is understood that the various components may actually be coupled to the control circuit and/or one or more other components directly.

While the above generally describes the identification of objects, such as retail products associated with a retail entity, the above described systems, processes, methods, apparatuses and the like can be applied to the identification of other items, particularly those having identifying codes (e.g., barcode, QR code, etc.).

In some embodiments, a product identifying system is provided comprising: a scanner control circuit; an imaging system communicatively coupled with the control circuit; a display communicatively coupled with the control circuit; and a memory communicatively coupled with the control circuit and storing local code comprising a product identifier module configured to be executed by the control circuit to: detect, through a first series of images captured by the imaging system, a machine-readable first identifier pattern determined to have a distance relationship to a center of a field of view of the imaging system; control the display to render the first series of images on the display as the respective images of the first series of images are captured; activate, a scan timer having a first scan duration; render, on the display while displaying a first subset of the first series of images, a scan timer graphic overlaid on the first subset of the first series of images and corresponding to a changing remaining time of the scan duration as the remaining time expires; confirm that the first identifier pattern was maintained within a threshold distance of the center of the field of view over at least a threshold read duration of the scan duration; extract identifying information based on the first identifier pattern in response to confirming that the first identifier pattern was maintained within the threshold distance of the center of the field of view over at least the threshold read duration of the scan duration; and obtain a product identifier corresponding to the identifying information and add the product identifier to a virtual shopping cart.

Some embodiments provide methods of identifying products, comprising: detecting, through a first series of images captured by an imaging system of a scanner system, a machine-readable first identifier pattern determined to have a distance relationship to a center of a field of view of the imaging system; controlling a display of the scanner system to render the first series of images on the display as the respective images of the first series of images are captured; activating a scan timer having a first scan duration; rendering, on the display while displaying a first subset of the first series of images, a scan timer graphic overlaid on the first subset of the first series of images and corresponding to a changing remaining time of the scan duration as the remaining time expires; confirming that the first identifier pattern was maintained within a threshold distance of the center of the field of view over at least a threshold read duration of the scan duration; extracting identifying information from based on the first identifier pattern in response to confirming that the first identifier pattern was maintained within the threshold distance of the center of the field of view over at least the threshold read duration of the scan duration; and obtaining a product identifier corresponding to the identifying information and adding the product identifier to a virtual shopping cart.

Some embodiments provide a pattern scanner tracker system that enhances the detection and scanning of identifier patterns (e.g., barcodes, QR codes, color patterns, text patterns, other such patterns or a combination of two or more patterns) to collect data by a scanner system (e.g., portable smartphone, table, smart glasses, optical head mounted system, virtual reality glasses and/or goggles, stationary scanning systems, and/or other such scanning systems) utilizing a camera in identify the identifier patterns. In some instances, the system further applies prioritization to identify and/or select an identifier pattern having a predefined position relative to a reference point to a field of view of the image capture system, which can correlate to a pre-defined portion of a display of the scanner system. Data, sensor information and/or other such information can be collected from the identifier pattern and/or conditions associated with scanning. Such data can include but is not limited to a pattern or symbology type, corresponding identifying numbers (e.g., encoded in the pattern), product information (e.g., name, size, quantity, etc.), location and size of the identifying pattern in the field of view of the imaging system, detected motion of the scanner system, incoming ambient light, other such data, or a combination of two or more of such data. This data can be processed and prioritize one or more identifier patterns in the view. The prioritization can be based on one or more factors such as but not limited to symbology, closest to a reference point or region (e.g., center of the field of view), distance from the imaging system, previous product identifications, purchase history, other such information, or a combination of two or more of such information. Further, some embodiments evaluate location, size, motion, incoming ambient light, and/or other such factors to define factors and/or behaviors that can be applied in prioritizing and/or filtering out identifier patterns. Such behaviors and/or factors may correlate with one or more tolerances and/or thresholds defined and/or determined for these behaviors and/or factors. Some embodiments enable one or more of these behaviors and/or factors to be turned on/off and have tolerances adjusted from configuration values stored remotely and read from the user's device periodically. Such adjustments may be user initiated, other adjustments may be based on updates, some may be based on detected problems and/or repeated problems, and/or other such causes.

Some embodiments can use the detection of motion while capturing one or more images to determine whether a captured identifier pattern was intentional or accidental, and disregard accidental captures and/or request confirmation regarding the accidental captures. As described above, some embodiments use the distance from the camera to the barcode or other identifier pattern to prioritize and select images and/or one or more particular barcodes and/or identifier patterns to scan.

Some embodiments provide scanner tracker systems that provide a scanner implementation that collects data from an imaging system of the scanner system (e.g., a camera of a smart device) to identify one or more identifier patterns in at least a portion of an image captured by the imaging system, and which may be displayed on a display of the scanner system. The data collected can include one or more identifier pattern types (symbology), identifier numbers, location, size of the identifier pattern, a relative size of the identifier pattern, measured scanner system motion, incoming ambient light, other such data, and typically two or more of such data. Some or all of the collected data can be processed to present on the display a location of an identifier pattern based one the application of one or more algorithms filtering and/or other processing and prioritize data and/or one or more identifier patterns based on predefined behaviors, conditions and/or other such factors as explained above and further below. In some embodiments, some or all of one or more of the location data, size data, motion data, incoming ambient light data and/or other data can be used to define behaviors that prioritize and/or filter out identifier patterns if one or more of these data sets has predefined relationships with and/or exceeds one or more thresholds and/or tolerances defined for these behaviors. Further, some embodiments enable behaviors to be enabled or disabled and allow adjustments to one or more thresholds and/or tolerances from configuration values, which may be stored locally and/or remotely, and read or updated from the scanner system.

Some embodiments detect multiple identifier patterns and enable the simultaneous scanning and tracking of two or more of the multiple identifier patterns. Adjusted targeting graphics may be rendered around each identifier pattern being scanned, and in some implementations provides a user option to select one or more products to quickly add to a virtual cart. Further, based on an identification, some embodiments display product details (e.g. price, discount/promotions, product reviews, etc.) when the identifying information is detected and/or product information is obtained based on the identifying information. In some embodiments, feedback can be provided when an identifier pattern is identified as being invalid (e.g. scan shelf code instead or products with multiple barcodes visible). Some embodiments can initiate one or more actions (automatically and/or manually from user input) to adjust/improve image capture, such as but not limited to zoom, focus, adjusting exposure, toggling a light source, etc. The identifier pattern can include patterns other than barcodes enabling product identification with products that do not have a barcode and/or a barcode is not fully visible. Users typically can interact with the scanning system, and some embodiments enable the use of augmented reality extension (e.g. eye blink to confirm scan). Typically, the scanner system implements prioritization and/or filtering of identifier patterns based on pattern symbology and/or type, location in view, scanner system motion, ambient light, and size/distance of the identifier pattern in view, and/or other such factors. In some embodiments, some or all of the prioritization and/or filtering thresholds, ranges and/or logic can be remotely configured In prioritizing an identifier pattern, some embodiments identify an identifier pattern nearest a center of rectangle of interest, which can be tracked over time, processed and scanned. Some identifier patterns can be recognized as not relevant and be ignored. The scanner and/or one or more products can be moved to enable the scanner system to shift the interest to a different identifier pattern. Such shift occurring while a previous identifier pattern and/or identifying information is being processed can, in some implementations, cancel processing and begin processing of the subsequent identifier pattern. Some embodiments adjust processing durations based on one or more factors, such as but not limited to when multiple identifier patterns are detected (e.g., to allow user selection), images are blurry, etc.

Some embodiments prioritize multiple symbologies for recognition while scanning. Further, in some implementations, when a detected symbology is not prioritized the corresponding identifier pattern may be ignored, and/or ignored when prioritized symbologies are present. When multiple prioritized symbologies are present, some embodiments identify an identifier pattern corresponding to a highest priority symbology to track. Such prioritization may be implemented regardless of a distance from a reference point. Some embodiments receive motion and/or accelerometer data while scanning is active to detect amounts of movement (e.g., calculate a moving average value). When the calculated motion value exceeds a threshold value, the user can be notified (e.g., yellow rectangle, text, warning symbol, etc.) and identifying an identifier pattern of interest may be postponed. The threshold motion value, in some embodiments, can be remotely configurable via an APP settings remote server. This filtering can be useful to prevent accidental product scans while the user is moving and/or not intending to scan.

Some embodiments provide distance filtering, which in part can limit inadvertent scanning. A scanning engine can detect a potential identifier pattern to scan, and size information (e.g., width, height of the pattern) detected and evaluated relative to one or more thresholds and/or ranges. For example, a largest side can be evaluated relative to a threshold value, and the user can be notified (e.g., yellow rectangle, text, pop-up, etc.) and bypass specifying a pattern of interest. Some embodiments enables the threshold motion value and/or the size threshold(s) can be specified separately for each symbology type, and in some instances can be remotely configurable. Again, this filtering can be useful to prevent accidental product scans for example when the scanner system is active and identifier patterns (e.g., in a cart) of previously scanned products is visible. Some embodiments further identify excessive and/or insufficient light. Data can be received that can be used to calculate a luminosity value. When the calculated luminosity value exceeds a threshold value and/or is outside a range, the scanner system can notify the user (e.g., red rectangle, text, pop-up, etc.) so that the user can take action (e.g., shading the imaging system to improve pattern recognition in bright environments), a light can be activated, other such actions, or a combination of such actions implemented. Some embodiments enable the brightness threshold value to be remotely configured.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A mobile product identifying system, comprising:
   a scanner control circuit;
   an imaging system communicatively coupled with the scanner control circuit;
   a display communicatively coupled with the scanner control circuit; and
   a memory communicatively coupled with the scanner control circuit and storing local code comprising a product identifier module configured to be executed by the scanner control circuit to:
      detect, through a first series of images captured by the imaging system, multiple identifier patterns within each of the first series of images, the multiple identifier patterns being machine-readable, the multiple identifier patterns including a first identifier pattern and a second identifier pattern;
      control the display to render the first series of images on the display as the respective images of the first series of images are captured;
      determine that the first identifier pattern and the second identifier pattern are both of a first identifier pattern type;
      determine that the first identifier pattern detected has a distance relationship to a center of a field of view of the imaging system;
      determine that within the first series of images the first identifier pattern is closer to a reference point than the second identifier pattern;
      activate a scan timer having a scan duration;
      prioritize the first identifier pattern as an identifier pattern of interest based on the determination that the first identifier pattern is closer to the reference point than the second identifier pattern;
      confirm that the first identifier pattern was maintained within a threshold distance of the center of the field of view over at least a threshold read duration of the scan duration;
      extract identifying information based on the first identifier pattern in response to confirming that the first identifier pattern was maintained within the threshold distance of the center of the field of view over at least the threshold read duration of the scan duration; and
      obtain a product identifier corresponding to the identifying information and add the product identifier to a virtual shopping cart.

2. The system of claim 1, wherein the product identifier module is configured to:
   determine, in response to prioritizing the first identifier pattern, an orientation of the first identifier pattern relative to an orientation of the display.

3. The system of claim 2, wherein the product identifier module is further configured to:
   render, on the display, the first series of images while rendering a virtual targeting graphic overlaid proximate the first identifier pattern indicating the first identifier pattern as the identifier pattern of interest based on the determined orientation of the first identifier pattern and distinguishing the first identifier pattern from the other of the multiple identifier patterns.

4. The system of claim 1, wherein the product identifier module is further configured to:
   detect multiple identifier patterns within a previous second series of multiple images captured by the imaging system prior to capturing the first series of multiple images;
   prioritize, based on the second series of images, the second identifier pattern of the multiple identifier patterns as an initial identifier pattern of interest;
   control the display to render the second series of multiple images on the display as the respective images of the second series of images are captured and further rendering a virtual targeting graphic overlaid proximate the second identifier pattern indicating the second identifier pattern as the initial identifier pattern of interest;
   detect, during the capture of the first series of images, a change of the first identifier pattern being positioned closer to another reference point than the second identifier pattern;
   implement the prioritizing of the first identifier pattern over the second identifier pattern in response to the detected change of the first identifier pattern being positioned closer to the other reference point; and
   transition the rendering of the virtual targeting graphic to being overlaid proximate the first identifier pattern indicating a change that the first identifier pattern is the identifier pattern of interest while preventing second identifying information from being extracted from the second identifier pattern.

5. The system of claim 1, wherein the product identifier module is further configured to:
   detect, through a second series of multiple images captured by the imaging system, a third identifier pattern;
   determine that the third identifier pattern is beyond a threshold distance from the imaging system; and
   prevent extracting third identifying information from the third identifier pattern while the third identifier pattern is beyond the threshold distance from the imaging system.

6. The system of claim 5, wherein the product identifier module is further configured to:
   render, on the display, the second series of multiple images while rendering a virtual distance error feedback graphic overlaid proximate the third identifier pattern while the third identifier pattern is beyond the threshold distance from the imaging system.

7. The system of claim 1, wherein the product identifier module is further configured to:
   detect a third identifier pattern through a second series of multiple images captured by the imaging system;
   detect movement, during the capture of the second series of multiple images, in excess of a threshold movement range between the imaging system and the third identifier pattern; and
   preventing third identifying information from being extracted from the third identifier pattern while the detected movement is in excess of the threshold movement range.

8. The system of claim 7, wherein the product identifier module is further configured to:
- detect a level of light while capturing a third series of multiple images captured by the imaging system;
- determine that the detected level of light while capturing the third series of multiple images is in excess of a threshold light level; and
- prevent fourth identifying information from being extracted from a fourth identifier pattern while the detected level of light is in excess of the threshold light level.

9. The system of claim 1, wherein the product identifier module is further configured to:
- identify, from at least the first series of images, multiple different identifier patterns simultaneously captured within each of the first series of images;
- control the display while rendering the first series of images to render, in each image of the first series of images, multiple virtual selection graphics each overlaid proximate to a respective one of the multiple different identifier patterns;
- detect a selection of the first identifier pattern by a user of a first virtual selection graphic, of the multiple virtual selection graphics, positioned most proximate to the first identifier pattern;
- wherein product identifier module in the prioritizing the first identifier pattern prioritizes the first identifier pattern over the other of the multiple different identifier patterns as a function of detected selection; and
- modify a visual appearance of the first virtual selection graphic in response to the detected selection indicating the first identifier pattern as the identifier pattern of interest.

10. A method of identifying products, comprising:
- detecting, through a first series of images captured by an imaging system of a scanner system, a first identifier pattern and a second identifier pattern, the first identifier pattern determined to have a distance relationship to a center of a field of view of the imaging system;
- controlling a display of the scanner system to render the first series of images on the display as the respective images of the first series of images are captured;
- determining that the first identifier pattern and the second identifier pattern are both of a first identifier pattern type;
- determining that the first identifier pattern detected has a distance relationship to a center of a field of view of the imaging system;
- determining that within the first series of images the first identifier pattern is closer to a reference point than the second identifier pattern;
- activating a scan timer having a scan duration;
- prioritizing the first identifier pattern as an identifier pattern of interest based on the determination that the first identifier pattern is closer to the reference point than the second identifier pattern;
- confirming that the first identifier pattern was maintained within a threshold distance of the center of the field of view over at least a threshold read duration of the scan duration;
- extracting identifying information from based on the first identifier pattern in response to confirming that the first identifier pattern was maintained within the threshold distance of the center of the field of view over at least the threshold read duration of the scan duration; and
- obtaining a product identifier corresponding to the identifying information and adding the product identifier to a virtual shopping cart.

11. The method of claim 10, further comprising:
- determining, in response to prioritizing the first identifier pattern, an orientation of the first identifier pattern relative to an orientation of the display.

12. The method of claim 11, further comprising:
- rendering, on the display, the first series of images while rendering a virtual targeting graphic overlaid proximate the first identifier pattern indicating the first identifier pattern as the identifier pattern of interest based on the determined orientation of the first identifier pattern and distinguishing the first identifier pattern from the other of the multiple identifier patterns.

13. The method of claim 10, further comprising:
- detecting multiple identifier patterns within a previous second series of multiple images captured by the imaging system prior to capturing the first series of multiple images;
- prioritizing, based on the second series of images, a second identifier pattern of the multiple identifier patterns as an initial identifier pattern of interest;
- controlling the display to render the second series of multiple images on the display as the respective images of the second series of images are captured and further rendering a virtual targeting graphic overlaid proximate the second identifier pattern indicating the second identifier pattern as the initial identifier pattern of interest;
- detecting, during the capture of the first series of images, a change of the first identifier pattern being positioned closer to a reference point than the second identifier pattern;
- prioritizing the first identifier pattern over the second identifier pattern in response to the detected change of the first identifier pattern being positioned closer to the reference point; and
- transitioning the rendering of the virtual targeting graphic to being overlaid proximate the first identifier pattern indicating a change that the first identifier pattern is the identifier pattern of interest while preventing second identifying information from being extracted from the second identifier pattern.

14. The method of claim 10, further comprising:
- detecting, through a second series of multiple images captured by the imaging system, second identifier pattern;
- determining that the second identifier pattern is beyond a threshold distance from the imaging system;
- render, on the display, the second series of multiple images while rendering a virtual distance error feedback graphic overlaid proximate the second identifier pattern while the second identifier pattern is beyond the threshold distance from the imaging system; and
- preventing extracting second identifying information from the second identifier pattern in response while the second identifier pattern is beyond the threshold distance from the imaging system.

15. The method of claim 10, further comprising:
- identifying, from at least the first series of images, multiple different identifier patterns simultaneously captured within each of the first series of images;
- controlling the display while rendering the first series of images to render, in each image of the first series of images, multiple virtual selection graphics each overlaid proximate to a respective one of the multiple different identifier patterns;

detecting a selection of the first identifier pattern by a user of a first virtual selection graphic, of the multiple virtual selection graphics, positioned most proximate to the first identifier pattern;

wherein the prioritizing the first identifier pattern comprises prioritizing the first identifier pattern over the other of the multiple different identifier patterns as a function of detected selection; and modifying a visual appearance of the first virtual selection graphic in response to the detected selection indicating the first identifier pattern as the identifier pattern of interest.

16. A non-transitory computer-readable media having computer-executable instructions that, upon execution by a computer, cause the computer to perform operations comprising:

detecting, through a first series of images captured by an imaging system of a scanner system, a first identifier pattern and a second identifier pattern, the first identifier pattern determined to have a distance relationship to a center of a field of view of the imaging system;

controlling a display of the scanner system to render the first series of images on the display as the respective images of the first series of images are captured;

determining that the first identifier pattern and the second identifier pattern are both of a first identifier pattern type;

determining that the first identifier pattern detected has a distance relationship to a center of a field of view of the imaging system;

determining that within the first series of images the first identifier pattern is closer to a reference point than the second identifier pattern;

activating a scan timer having a scan duration;

prioritizing the first identifier pattern as an identifier pattern of interest based on the determination that the first identifier pattern is closer to the reference point than the second identifier pattern;

confirming that the first identifier pattern was maintained within a threshold distance of the center of the field of view over at least a threshold read duration of the scan duration;

extracting identifying information from based on the first identifier pattern in response to confirming that the first identifier pattern was maintained within the threshold distance of the center of the field of view over at least the threshold read duration of the scan duration; and obtaining a product identifier corresponding to the identifying information and adding the product identifier to a virtual shopping cart.

17. The computer-readable media of claim 16 having computer-executable instructions that, upon execution by a computer, cause the computer to perform further operations comprising:

determining, in response to prioritizing the first identifier pattern, an orientation of the first identifier pattern relative to an orientation of the display.

18. The computer-readable media of claim 17 having computer-executable instructions that, upon execution by a computer, cause the computer to perform further operations comprising:

rendering, on the display, the first series of images while rendering a virtual targeting graphic overlaid proximate the first identifier pattern indicating the first identifier pattern as the identifier pattern of interest based on the determined orientation of the first identifier pattern and distinguishing the first identifier pattern from the other of the multiple identifier patterns.

19. The computer-readable media of claim 16 having computer-executable instructions that, upon execution by a computer, cause the computer to perform further operations comprising:

detecting multiple identifier patterns within a previous second series of multiple images captured by the imaging system prior to capturing the first series of multiple images;

prioritizing, based on the second series of images, a second identifier pattern of the multiple identifier patterns as an initial identifier pattern of interest;

controlling the display to render the second series of multiple images on the display as the respective images of the second series of images are captured and further rendering a virtual targeting graphic overlaid proximate the second identifier pattern indicating the second identifier pattern as the initial identifier pattern of interest;

detecting, during the capture of the first series of images, a change of the first identifier pattern being positioned closer to a reference point than the second identifier pattern;

prioritizing the first identifier pattern over the second identifier pattern in response to the detected change of the first identifier pattern being positioned closer to the reference point; and transitioning the rendering of the virtual targeting graphic to being overlaid proximate the first identifier pattern indicating a change that the first identifier pattern is the identifier pattern of interest while preventing second identifying information from being extracted from the second identifier pattern.

* * * * *